US012760152B2

(12) United States Patent
Mis Solval et al.

(10) Patent No.: US 12,760,152 B2
(45) Date of Patent: Oct. 13, 2026

(54) MARINE-BASED GELATIN POWDERS AND METHODS OF MAKING

(71) Applicant: University of Georgia Research Foundation, Inc., Athens, GA (US)

(72) Inventors: Kevin Estuardo Mis Solval, Sharpsburg, GA (US); Peter George Chiarelli, Griffin, GA (US); Jinru Chen, Peachtree City, GA (US)

(73) Assignee: UNIVERSITY OF GEORGIA RESEARCH FOUNDATION, INC, Athens, GA (US)

( * ) Notice: Subject to any disclaimer, the term of this patent is extended or adjusted under 35 U.S.C. 154(b) by 560 days.

(21) Appl. No.: 17/879,171

(22) Filed: Aug. 2, 2022

(65) Prior Publication Data

US 2023/0050896 A1 Feb. 16, 2023

Related U.S. Application Data

(60) Provisional application No. 63/203,918, filed on Aug. 4, 2021.

(51) Int. Cl.

*C08H 1/06* (2006.01)
*C08J 3/12* (2006.01)
*C08L 89/06* (2006.01)

(52) U.S. Cl.

CPC .................. *C08H 1/06* (2013.01); *C08J 3/12* (2013.01); *C08L 89/06* (2013.01); *C08J 2489/04* (2013.01)

(58) Field of Classification Search

CPC ........... C08H 1/06; C08J 3/12; C08J 2489/04; C08L 89/06

See application file for complete search history.

(56) References Cited

U.S. PATENT DOCUMENTS 7,241,871 B2 * 7/2007 Wolfinbarger, Jr. ...... A23J 1/04 424/70.6

FOREIGN PATENT DOCUMENTS

WO WO-2014209101 A2 * 12/2014 ........... A61K 35/614
WO WO-2015012682 A2 * 1/2015 ............. C07K 1/145

OTHER PUBLICATIONS

Basso L, Papadia P, Rizzo L, Migoni D, Fanizzi FP, Piraino S. Trace metals do not accumulate over time in the edible Mediterranean jellyfish Rhizostoma pulmo (Cnidaria, Scyphozoa) from urban coastal waters. Water. May 18, 2021;13(10):1410. (Year: 2021).*

Hsieh YH, Leong FM, Barnes KW. Inorganic constituents in fresh and processed cannonball jellyfish (*Stomolophus meleagris*). Journal of Agricultural and Food Chemistry. Oct. 17, 1996;44(10):3117-9. (Year: 1996).*

Morais ZB, Pintao AM, Costa IM, Calejo MT, Bandarra NM, Abreu P. Composition and in vitro antioxidant effects of jellyfish Catostylus tagi from Sado Estuary (SW Portugal). Journal of Aquatic Food Product Technology. Mar. 31, 2009;18(1-2):90-107. (Year: 2009).*

Santos MH, Silva RM, Dumont VC, Neves JS, Mansur HS, Heneine LG. Extraction and characterization of highly purified collagen from bovine pericardium for potential bioengineering applications. Materials Science and Engineering: C. Mar. 1, 2013;33(2):790-800. (Year: 2013).*

Lueyot A, Rungsardthong V, Vatanyoopaisarn S, Hutangura P, Wonganu B, Wongsa-Ngasri P, Charoenlappanit S, Roytrakul S, Thumthanaruk B. Influence of collagen and some proteins on gel properties of jellyfish gelatin. PLoS One. Jun. 18, 2021;16(6):e0253254. (Year: 2021).*

Niu L, Zhou X, Yuan C, Bai Y, Lai K, Yang F, Huang Y. Characterization of tilapia (*Oreochromis niloticus*) skin gelatin extracted with alkaline and different acid pretreatments. Food Hydrocolloids. Dec. 1, 2013;33(2):336-41. (Year: 2013) .*

Phillips AT, Signs MW. Desalting, concentration, and buffer exchange by dialysis and ultrafiltration. Current Protocols in Protein Science. Nov. 2004;38(1):4-. (Year: 2004).*

Khong NM, Yusoff FM, Jamilah B, Basri M, Maznah I, Chan KW, Nishikawa J. Nutritional composition and total collagen content of three commercially important edible jellyfish. Food chemistry. Apr. 1, 2016;196:953-60. (Year: 2016).*

Hsieh YH, Leong FM, Rudloe J. Jellyfish as food. Hydrobiologia. May 2001;451(1):11-7. (Year: 2001).*

Sow LC, Yang H. Effects of salt and sugar addition on the physicochemical properties and nanostructure of fish gelatin. Food Hydrocolloids. Mar. 1, 2015;45:72-82. (Year: 2015).*

Lueyot, A., Rungsardthong, V., et al., 2020. Improved physicochemical properties of type A gelatin from by-products salted jellyfish (*Lobonema smithii*) by optimized pretreatment and extraction conditions. Research Square. (Year: 2020).*

Abdelhedi et al. Rheological and structural properties of Hemiramphus far skin gelatin: Potential use as an active fish coating agent, 2018 Elsevier Ltd. Aug. 4, 2018.

Ahmad et al. Compositional and physicochemical characteristics of acid solubilized collagen extracted from the skin of unicorn leather jacket (*Aluterus monoceros*) 2010 Elsevier Ltd. Mar. 5, 2010.

Akagündüz et al., Sea bream bones and scales as a source of gelatin and ACE inhibitory peptides, 2013 Elsevier Ltd., Oct. 2, 2013.

Al-Kahtani, Irwandi Jaswir, Elsayed A. Ismail, Mohammed Asif Ahmed, Ademola Monsur Hammed, Saeed Olorunnisola & Fitri Octavianti (2017) Structural characteristics of camel-bone gelatin by demineralization and extraction, International Journal of Food Properties, 20:11, 2559-2568, DOI: 10.1080/10942912.2016.1244543.

(Continued)

*Primary Examiner* — Jennifer M.H. Tichy
*Assistant Examiner* — EMily F Eix
(74) *Attorney, Agent, or Firm* — Perilla Knox & Hildebrandt LLP; Stephanie L. Davy-Jow

(57) ABSTRACT

Provided are gelatin powders and gels derived from marine sources of collagen such as jellyfish. Also provided are methods for producing marine-derived gelatin powders. The marine-derived collagen source is hydrolyzed then dialyzed to at least partially demineralize the marine-derived collagen source.

8 Claims, 9 Drawing Sheets

(56) References Cited

OTHER PUBLICATIONS

Alfaro et al., African catfish (*Clarias gariepinus*) skin gelatin: Extraction optimization and physical-chemical properties, 2014 Elsevier Ltd.,online Jun. 7, 2014.
Barzideh et al., Isolation and characterisation of collagen from the ribbon jellyfish (*Chrysaora* sp.), International Journal of Food Science and Technology 2014, 49, 1490-1499, Nov. 19, 2013.
Binsi et al. Rheological and functional properties of gelatin from the skin of Bigeye snapper (*Priacanthus hamrur*) fish: Influence of gelatin on the gel-forming ability of fish mince, 2007 Elsevier Ltd., Dec. 9, 2007.
Antonela D. Borza, Nana T. Annan, Debra L. Moreau, Paula M. Allan-Wojtas, Amyl Ghanem, Dérick Rousseau, Allan T. Paulson & Lisbeth Truelstrup Hansen (2010) Microencapsulation in genipin cross-linked gelatine-maltodextrin improves survival of Bifidobacteriumadolescentis during exposure to invitro gastrointestinal conditions, Journal of Microencapsulation, 27:5, 387-399, DOI: 10.3109/02652040903367293.
Boudhrioua et al., Study of moisture and salt transfers during salting of sardine fillets, 2009 Elsevier Ltd. Feb. 14, 2009.
Brizzi et al. Salt matters: How salt affects the rheological and physical properties of gelatine for analogue modelling, 2016 Elsevier, Mar. 25, 2016.
Chatterjee et al., Effect of Salt and Temperature on Visco-elasticity of Gelatin Hydrogels, Polymer and Biophysics Laboratory, School of Sciences, Jawaharlal Nehru University, New Delhi 11067, India, J. Surface Sci Technol., vol. 22, No. 1-2, pp. 1-13, 2006.
Cheng et al. Using fish gelatin and pectin to make a low-fat spread, Food Hydrocolloids 22 (2008) 1637-1640, 26, 2007 Elsevier Ltd. Oct. 2007.
Cheng et al., Identification of the AI-binding proteins that account for aluminum neurotoxicity and transport in vivo, The Royal Society of Chemistry 2018 7, 127-135 , Oct. 1, 2017.
Cho et al. Physicochemical Properties of Gelatin from Jellyfish Rhopilema hispidum, Fish Aquat Sci 17(3), 299-304, 2014, Apr. 23, 2014.
Choi et al., Physicochemical and Sensory Characteristics of Fish Gelatin, Journal of Food Science—vol. 65, No. 2, 2000.
Chuaychan et al., Element distribution and morphology of spotted golden goatfish fish scales as affected by demineralisation, 2015 Elsevier Ltd., Apr. 29, 2015.
Etxabide et al., Effect of pH and lactose on cross-linking extension and structure of fish gelatin films, 2017 Elsevier B. V. Feb. 18, 2017.
Evans et al., Concentration of Proteins and Removal of Solutes, book Methods in Enzymology, vol. 463, chapter 9.
GMIA, Standard Testing Methods for Edible Gelatin, Official procedures of the Gelatin Manufacturers Institute of America, Inc. pp. 1-33, Jan. 2019.
Gomez-Guillen et al., Structual and Physical properties of gelatin extracted from different marine species: a comparative study, Elsevier Dec. 2000.
Gudmundsson et al., Gelatin from cod skins as affected by chemical treatments, vol. 62, No. 1, 1997—Journal of Food Science.
Hsieh et al., Jellyfish as food, 2001 Kluwer Academic Publishers., Hydrobiologia 451: 11-17,2001.
Richard Ipsen, Uniaxial Compression of Gels Made From Protein and K-Carrageenan, Department of Food and Dairy Science fie Royal Veterinary and Agricultural University Rolighedsvej 30 1958 Frederiksberg C, Denmark, Manuscript received Oct. 11, 1996.
Iian Tan et al., Simultaneous extraction and purification of aloe polysaccharides and proteins using ionic liquid based aqueous two-phase system coupled with dialysis membrane, 2011 Elsevier B.V., Sep. 25, 2011.
Jiang et al. Comparison of concurrent and mixed-flow spray drying on viability, growth kinetics and biofilm formation of Lactobacillus rhamnosus GG microencapsulated with fish gelatin and maltodextrin, 2020 Elsevier Ltd. Jan. 6, 2020.
Kamel et al., Some Factors Affecting Gelatin Gel Texture Evaluation by Penetration Testing, Department of Food Science University of Guelph Guelph, Ontario Canada, Manuscript received Feb. 14, 1977.
Karim et al., Fish gelatin: properties, challenges, and prospects as an alternative to mammalian gelatins, 2008 Elsevier Ltd. Mar. 20, 2008.
Kempka et al., Influence of Bloom Number and Plastifiers on Gelatin Matrices Produced for Enzyme Immobilization, State University of Santa Catarina, Food Engineering Department, Brazilian Journal of Chemical Engineering, Oct. 10, 2012.
Khong et al., Nutritional composition and total collagen content of three commercially important edible jellyfis, Food Chemistry 196 (2016) 953-960, Apr. 19, 2015.
Khong et al., Improved collagen extraction from jellyfish (*Acromitus hardenbergi*) with increased physical-induced solubilization processes, Food Chemistry 251 (2018) 41-50, 2017 Elsevier Ltd., Mar. 20, 2017.
Kohandel et al., Estimation of the quasi-linear viscoelastic parameters using a genetic algorithm, Mathematical and Computer Modelling 47 (2008) 266-270, Aug. 29, 2005.
Leone et al., The Bright Side of Gelatinous Blooms: Nutraceutical Value and Antioxidant Properties of Three Mediterranean Jellyfish (*Scyphozoa*), Mar. Drugs 2015, 13, 4654-4681; doi:10.3390/md13084654.
Xiao Yan Li, Dr Xi Guang Chen, Dong Su Cha, Hyun Jin Park & Cheng Sheng Liu (2009) Microencapsulation of a probiotic bacteria with alginate-gelatin and its properties, Journal of Microencapsulation, 26:4, 315-324, DOI:10.1080/02652040802328685.
Li et al., Physicochemical Properties of Collagen from Acaudina Molpadioides and Its Protective Effects against H2O2-Induced Injury in RAW264.7 Cells, Marine. Drugs 2020, 18, 370; doi:10.3390/md18070370, Jun. 16, 2020.
Lueyot et al., Improved physicochemical properties of type A gelatin from by-products salted jellyfish (*Lobonema smithii*) by optimized pretreatment and extraction conditions, https://doi.org/10.21203/rs.3.rs-62849/v1, Sep. 2, 2020.
Mis Solval et al., Development of cantaloupe (*Cucumis melo*) juice powders using spray drying technology, Food Science and Technology 46 (2012) 287e293, 2011 Elsevier Ltd., Feb. 1, 2011.
Nurul et al., Effects of pH on functional, rheological and structural properties of eel (*Monopterus* sp.) skin gelatin compared to bovine gelatin, IJournal homepage: http://www.ifrj.upm.edu.my, nternational Food Research Journal 22 (2): 572-583 (2015).
Fernando A. Osorio , Elizabeth Bilbao , Rubén Bustos & Fresia Alvarez (2007) Effects of Concentration, Bloom Degree, and pH on Gelatin Melting and Gelling Temperatures Using Small Amplitude Oscillatory Rheology, International Journal of Food Properties, 10:4, 841-851, DOI: 10.1080/10942910601128895.
Papadopoulou et al., Rheological and Morphological Investigation of Renaturated Collagen Nanogels in Physiological-like Solution Conditions, Materials Today: Proceedings 3 ( 2016 ) 875-888, 2016 Published by Elsevier.
Phillips et al., Desalting, Concentration, and Buffer UNIT 4.4 Exchange by Dialysis and Ultrafiltration, Current Protocols in Protein Science (2004) 4.4.1-4.4.15, 2004 by John Wiley & Sons, Inc.
Rodsuwan et al., Functional properties of type A gelatin from jellyfish (*Lobonema smithii*), International Food Research Journal 23(2): 507-514 (2016), Jun. 1, 2015.
Schacht et al., Some Aspects of the Crosslinking of Gelatin by Dextran Dialdehydes, Polymer Gels and Networks 1 (1993) 213-224, Feb. 10, 1993.
Siimon et al., Increasing mechanical strength of electrospun gelatin nanofibers by the addition of aluminum potassium sulfate, Feb. 16, 2015; accepted Apr. 28, 2015.
USDA Bulk Density, 2012, pp. 1-9.
Wang et al., Effect of cassava starch gel, fish gel and mixed gels and thermal treatment on structure development and various quality parameters in microwave vacuum-dried gel slices, Food Hydrocolloids 33 (2013) 26-37, 2013 Elsevier Ltd., Feb. 10, 2013.
Wang et al., Gel properties and interactions of Mesona blumes polysaccharide-soy protein isolates mixed gel: The effect of salt

(56) References Cited

OTHER PUBLICATIONS addition, https://doi.org/10.1016/j.carbpol.2018.03.064, Carbohydrate Polymers 192 (2018) 193-201, 2018 Elsevier Ltd. Jan. 27, 2018.
Wardhan et al., Characteristics of Demineralized Gelatin from Lizardfish (*Saurida* spp.) Scales Using NaOH—NaCl Solution, JBAT 6(2) (2017) 132-142, Dec. 2017.
Zhang et al., Pre-treatment optimization and properties of gelatin from freshwater fish scales, food and bioproducts processing 8 9 ( 2 0 1 1 ) 185-193, 2010 The Institution of Chemical Engineers. Published by Elsevier B.V.
Matinong, A. M. E., Chisti, Y., Pickering, K. L., & Haverkamp, R. G. (2022). Collagen extraction from animal skin. Biology, 11(6), 905. https://doi.org/10.3390/biology11060905.
Meng, D., Tanaka, H., Kobayashi, T., Hatayama, H., Zhang, X., Ura, K., Yunoki, S., & Takagi, Y. (2019). The effect of alkaline pretreatment on the biochemical characteristics and fibril-forming abilities of types I and II collagen extracted from bester sturgeon by-products. International Journal of Biological Macromolecules, 131, 572-580. https://doi.org/10.1016/j.ijbiomac.2019.03.091.
Peter G. Chiarelli, Conor G. Fair, Ronald B. Pegg, Kevin Mis Solval, Modifying and improving the Bloom strength and rheological properties of jellyfish gelatin, Food Hydrocolloids, vol. 159, 2025, 110692, ISSN 0268-005X, https://doi.org/10.1016/j.foodhyd.2024.110692.
Peter G. Chiarelli, Jinru Chen, Ronald B. Pegg, Kevin Mis Solval, Demineralization enhances the physicochemical properties of hydrolyzed collagen powders derived from cannonball jellyfish (*Stomolophus meleagris*), Food Bioscience, vol. 56, 2023, 103183, ISSN 2212-4292, https://doi.org/10.1016/j.fbio.2023.103183.

* cited by examiner

MARINE-BASED GELATIN POWDERS AND METHODS OF MAKING

CROSS-REFERENCE TO RELATED APPLICATIONS

This application claims the benefit of and priority to U.S. Provisional Application Ser. No. 63/203,918, having the title "MARINE-BASED GELATIN POWDERS AND METHODS OF MAKING", filed on Aug. 4, 2021, the disclosure of which is incorporated herein by reference in its entirety.

STATEMENT REGARDING FEDERALLY SPONSORED RESEARCH OR DEVELOPMENT

This invention was made with Government support under contract NIFA 2021-67017-33442 awarded by the United States Department of Agriculture. The Government has certain rights in the invention.

BACKGROUND

Gelatin (hydrolyzed collagen) is a hydrocolloid used in several food applications including confections (chewiness, texture, and foam stabilization), low-fat spreads (creaminess, fat reduction, and mouthfeel), dairy (stabilization and texturization), baked goods (emulsification, gelling, and stabilization), meats (water-binding) as well as lowering caloric density. Gelatin is also used as low-calorie thickener in gluten-free products. Commercial gelatins are normally obtained from mammalian collagen, mainly from bovine and porcine sources. Gelatins obtained from marine sources have gained the attention of the global food industry in recent years due to advantages including lower gelling and melting temperatures compared to bovine and porcine gelatins, which allows for a quick release of encapsulated aromas and flavors. Furthermore, marine gelatins can be excellent encapsulating agents for vitamins, bioactives, colors, flavors, and probiotic bacteria. However, poor rheological and mechanical properties, variable quality, off-flavors, production costs and low yields are often associated with marine gelatins. These needs and other needs are satisfied by the present disclosure.

SUMMARY

Embodiments of the present disclosure provide for gelatin powders from marine-derived collagen sources, gelatin from marine-derived collagen sources, and methods for making gelatin powders and gelatin from marine-derived collagen sources.

An embodiment of the present disclosure includes methods for producing marine-derived gelatin powders. The methods can include hydrolyzing a marine-derived collagen source and dialyzing the hydrolyzed marine-derived collagen source to at least partially demineralize the marine-derived collagen source to produce a dialyzed marine-derived collagen product.

An embodiment of the present disclosure also includes marine-derived gelatin powders that include dialyzed jellyfish.

An embodiment of the present disclosure also includes marine-derived gelatin gels. The gels can include gelatin powder obtained from dialyzed dried, salted jellyfish and a liquid.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure.

FIG. 4B=7° C.; FIG. 4C=10° C.). H-SDJ=Gelatin gels produced with hydrolyzed salted, dried jellyfish; D-SDJ=Gelatin gels produced with hydrolyzed and dialyzed salted, dried jellyfish. $^{abcd}$Means treatments with different letters at the same pH and maturation temperature (° C.) are significantly different (P<0.5).

FIG. 5B=7° C.; FIG. 5C=10° C.). H-SDJ=Gelatin gels produced with hydrolyzed salted, dried jellyfish; D-SDJ=Gelatin gels produced with hydrolyzed and dialyzed salted, dried jellyfish. $^{abcd}$Means treatments with different letters at the same solid concentration (%) and maturation temperature (C) are significantly different (P<0.5).

FIG. 6B=6.67%; FIG. 6C=10%). H-SDJ=Gelatin gels produced with hydrolyzed salted, dried jellyfish; D-SDJ=Gelatin gels produced with hydrolyzed and dialyzed salted, dried jellyfish. $^{abcd}$Indicates treatments with different letters at the same pH and solid concentration (%) are significantly different (P<0.05).

Figure 1:
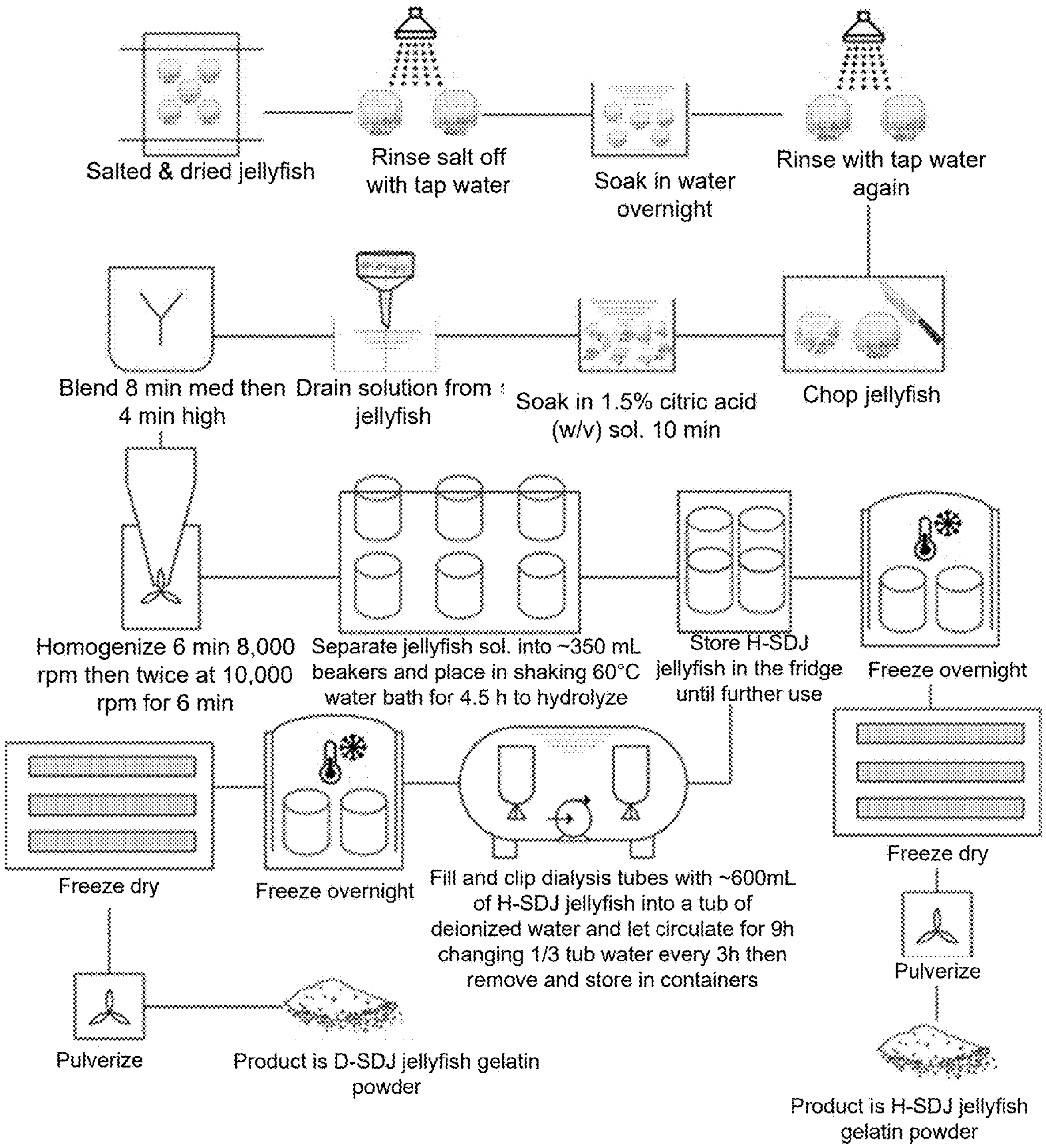
FIG. 1 is a diagram illustrating the process to turn salted, dried jellyfish (SDJ) into hydrolyzed jellyfish powders (H-SDJ) and/or hydrolyzed and dialyzed jellyfish powders (D-SDJ) in accordance with embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, food science, and the like, which are within the skill of the art.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Definitions

The Bloom test, as used herein, is a test to determine the force in grams needed by a specified plunger to depress the surface of a gel (contained in a Bloom jar) by 4 mm without breaking it at a specified temperature.

General Discussion

In accordance with the purpose(s) of the present disclosure, as embodied and broadly described herein, embodiments of the present disclosure, in some aspects, relate to marine-derived gelatin gels and powders, and methods of making.

In general, embodiments of the present disclosure provide for methods of making marine-derived dialyzed gelatin powders, compositions including dialyzed marine-derived collagen sources, and products including marine-derived dialyzed gelatin powders.

The present disclosure includes a method for producing gelatin powders that includes hydrolyzing a marine-derived collagen source and dialyzing the hydrolyzed collagen source to at least partially demineralize the collagen source to produce a dialyzed collagen product. Advantageously, dialysis of the collagen source removes excess salts and minerals and can improve the Bloom strength of gelatin gels including the dialyzed gelatin powder and improve aggregation of proteins in the gelatin gels. The resultant marine-derived dialyzed gelatin powders reported here have shown bloom values of about 20 to about 75 g. Mammalian gelatin powders have bloom values of >150 g. However, lower bloom values are needed in gelatin powders with low melting temperatures for a rapid release of encapsulating products. Bloom value indicates the best use/application for the gelatin powders. For example, gelatin powders with high bloom values (>250 g) are used to produce gelatin capsules, where gelatin powders with low bloom values (50-100 g) are preferable in food applications where gelatin is used as a stabilizer and/or emulsifier. Advantageously, the methods described herein allow for consistent production of high-quality marine-derived gelatin powders with high yields and enhanced rheological and mechanical properties that can be tailored according to the final applications.

In some embodiments, the marine-derived collagen source is dried, salted jellyfish. In some embodiments, the dried, salted jellyfish is Cannonball jellyfish (*Stomolophus meleagris*). In other embodiments, other marine-derived collagen sources can be used, including but not limited to such as *Catostylus tagi, Aurelia aurita, Lobonema smithii, Acromitus hardenbergi, Rhopilema hispidum*, or *Rhopilema esculentum*. The marine-derived collagen source can also be provided in a fresh or frozen state, or in an unsalted state.

The method can further include freeze drying and/or pulverizing the dialyzed collagen product. The dialyzed product can be a slurry which can be refrigerated or frozen for processing into a powder at a later stage of the supply chain.

The dialyzing step can remove about 75% or more of the total mineral content from the collagen source, wherein the mineral content can include such as calcium, potassium, magnesium, phosphorus, sulfur, aluminum, boron, cadmium, chromium, copper, iron, manganese, molybdenum, sodium, nickel, lead, and zinc.

In some embodiments, the dialyzing removes about 90% or more, about 97% or more, or about 98.6% or more of Na from the collagen source. In a particular embodiment, a powder obtained from the method can comprise about 3310 ppm Na on a dry basis (db).

Embodiments of the present disclosure include a marine-derived gelatin powder formed from a dialyzed collagen source as described above. Advantageously, the gelatin powder is shelf stable and can have larger mean particle sizes, lower bulk density, smoother microstructures, and a higher crude protein content than a powder from the same collagen source that is undialyzed.

In some embodiments, the mean particle size is about 5.6 μm to about 260 μm, about 25 μm to 75 μm, about 94 μm to 100 μm, or about 240 μm to 260 μm. The gelatin powder can have about 80% to 90% or about 84% to 87% crude protein content. The gelatin powder, when formed from freeze dried collagen sources, can have a bulk density of about 0.035 to 0.040 g/cm$^3$, or about 0.037 to 0.039 g/cm$^3$. The particle size and bulk density of the dialyzed gelatin powders can be further changed by changing the drying method. In other embodiments, the gelatin powder can be obtained using spray drying technology. Spray dried powders can have a density of about five times higher than that of freeze-dried powders.

In some embodiments, the marine collagen source (e.g. salted, dry jellyfish) can be pulverized before hydrolysis. This may allow for more control of the particle size of gelatin powder. Additionally, drying and pulverization of the jellyfish can be considered for a large-scale commercial production of gelatins. For example, fresh jellyfish can be caught in the coastal waters of a location such as Georgia USA, then dehydrated and pulverized in a facility close to coastal Georgia. The dry pulverized jellyfish (with no gelling properties) can be easily transported to other processing facilities for further processing, such as the hydrolysis and dialysis described herein without significantly affecting the gelling properties of the resultant powders.

Embodiments of the present disclosure also include marine-derived gelatin gels comprising a gelatin powder as described above and a liquid such as water. In some embodiments, the ratio of gelatin powder to liquid can about 5% to 10% by weight. Advantageously, gelatin gels produced with the dialyzed collagen source can have higher Bloom strengths than those produced with a non-dialyzed version of the same collagen source. For example, the gelatin gel can have a Bloom strength of about 5 g to 75 g, or about 20 g to 75 g.

In some embodiments, the gelatin gels described herein can have an isoelectric point of about 4.4, and the gels can have a pH of about 3 to 7, or about 4.4 to 6.5.

In some embodiments, the maturation temperature of the gelatin gel can be about 7° C. to 10° C. or about 4° C. to 10° C.

As described above, the marine-derived collagen source can be provided in a fresh or frozen state, or in an unsalted state. The dialysis procedure can be adjusted to account for fresh or frozen sources having a higher moisture and less minerals than salted, dry sources.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Cannonball jellyfish is a good source of collagen. Gelatin is a food-grade hydrocolloid derived from the partial hydrolysis of collagen. The aim of the study described herein was to develop gelatin powders from salted, dried jellyfish (SDJ) and determine the effect of mineral removal, pH adjustment, solid concentration, and maturation temperature on the Bloom strength of resultant gelatin gels. SDJ was hydrolyzed using citric acid solution at 60° C. for 4.5 h, demineralized via dialysis, freeze-dried, and pulverized to produce dialyzed jellyfish gelatin powders (D-SDJ). Hydrolyzed (non-dialyzed) jellyfish powders were used as the control (H-SDJ). Demineralizing of H-SDJ removed ~77% of the minerals, predominately Na, Ca, Mg, and K. D-SDJ showed larger mean particle sizes, lower bulk density, smoother microstructures, and a higher crude protein content than H-SDJ. The isoelectric point of H-SDJ and D-SDJ was close to 4.4. Higher Bloom values were observed in gelatin gels produced with 10% (w/w) D-SDJ, at pH 4.4 and/or 6.5 and maturated at 4 and/or 7° C. Gelatin gels produced with D-SDJ showed higher Bloom strengths than those produced with H-SDJ. This study demonstrates the effectiveness of demineralization, pH adjustment, maturation temperature, and solid concentration on the Bloom strength of jellyfish gelatin gels, creating a marine gelatin powder that could be used in several food applications.

From a feasibility study that demonstrated that the hydrolyzed salted, dried jellyfish powders (H-SDJ) produced a weak gelatin gel, it was found that H-SDJ had a high mineral content and low pH. Therefore, it was hypothesized that removing excess mineral and modifying the pH of H-SDJ could result in stronger gelatin gels.

According to Karim and Bhat (2009), the properties of gelatin gels such as viscosity, gel strength, gelling and melting temperature are affected by molecular weight and distribution of peptides, solid concentration of the gelatin solution, gel maturation time and temperature, pH, and salt content. Recent studies on a Type A gelatin produced from the jellyfish (*Lobonema smithii*) reported that pH, maturation temperature, time of pretreatment, and the extraction process initially performed on the raw material affects the yield and strength of the resultant gelatins gels (Lueyot et al., 2020; Rodsuwan, Thumthanaruk, Kerdchoechuen, & Laohakunjit, 2016).

In a previous study, it was found that H-SDJ contains a high amount of minerals, especially Na and Al. According to Chatterjee and Bohidar (2006), high concentration of NaCl reduces the strength and stiffness of gelatin gel networks. Moreover, sodium ions (Na+) can inhibit gelatin formation by shielding or screening proteins which leads to a decrease in the ability for the protein molecules to aggregate or gel (Cheng, Lim, Chow, Chong, & Chang, 2008). Hence, it was hypothesized that removing excess salts in H-SDJ using a dialysis process may improve the Bloom strength of the resultant gelatin gels. Dialysis is a size-based separation method that allows for selective-diffusion of molecules, mostly minerals in this case, to travel from a concentrated solution through a semipermeable membrane into a dialysis buffer, like deionized water (Evans, Romero, & Westoby, 2009). Researchers have demonstrated the removal of excess salts from a protein solution and an aloe polysaccharide solution using dialysis (Phillips & Signs, 2004; Tan, Li, Xu, & Xing, 2012). Currently, no studies have demonstrated how mineral removal may affect the Bloom strength of jellyfish gelatins.

Modifying the pH of gelatin gels may affect its Bloom strength (Etxabide, Urdanpilleta, Gómez-Arriaran, De La Caba, & Guerrero, 2017). According to J. Li, Li, Li, Yang, and Jin (2020), the stability of marine collagens can be understood by determining their isoelectric points ($I_p$) through the determination of zeta potential values. Collagen molecules begin to form aggregates when they are suspended in a solution close to their $I_p$ (zeta potential=0). It has been noted that collagen extracted from different organisms tend to have different $I_p$s due to a varying amino acid composition. For example, collagens obtained from organisms that have more acidic amino acids like glutamic acid tend to have lower isoelectric points (J. Li et al., 2020). An interesting study of the effect of pH adjustment on functional, rheological, and structural properties of eel skin gelatin showed that eel skin treated at a higher pH (~8) exhibited higher emulsifying, foaming, fat binding, gel strength, gelling and melting temperature, and viscoelasticity properties (Nurul & Sarbon, 2015).

Osorio, Bilbao, Bustos, and Alvarez (2007), reported that mammalian gelatin gels with three Bloom strengths (180, 220, and 240 g) were utilized and an increase in gel strength was observed with an increase in solid concentration (5, 7, and 10% w/v). Interestingly, the melting ($T_m$) and gelling ($T_g$) temperatures also increased with an increase in solid concentration and pH (from 3 to 6) for all gelatin gels; while maturation temperatures of the gelatin gels did not affect their $T_g$ and $T_m$. Every gelatin demonstrated higher storage modulus (G') values than loss modulus (G") for temperatures lower than $T_m$. The study also reported a model which correlates $T_m$ and $T_g$ with pH and solid concentration at a fixed gel strength (Osorio et al., 2007). This information is extremely useful in finding new and innovative ways to make suboptimal gelatins into gelatins with more desirable properties for use in products ranging from foods to cosmetics, pharmaceuticals, or even in medical applications.

To date, there are no scientific studies that have reported on the effect of pH adjustment on the physicochemical properties of gelatin obtained from cannonball jellyfish. Scientific studies conducted in this area may contribute to the utilization and optimization of marine gelatins. Preliminary studies in our lab have successfully demonstrated the removal of minerals from SDJ by a dialysis process. Hence, the objective of this study was to produce gelatin powders from SDJ and determine the effect of mineral removal, pH adjustment, solid concentration, and maturation temperature on the Bloom strength of resultant gelatin gels.

Materials and Methods

Materials

Commercial salted, dried cannonball jellyfish (*Stomolophus meleagris*) (SDJ) were purchased from Golden Island International LLC (Darien, Georgia, USA). Dialysis tubing was purchased from Spectrum Laboratories, Inc. (Rancho Dominguez, CA). Sodium hydroxide anhydrous pellets were purchased from Sigma Aldrich (St. Louis, MO., USA). All other reagents were analytical grade and obtained from Sigma Aldrich (St. Louis, MO, USA).

Production of Dialyzed Gelatin Powders from SDJ (D-SDJ)

Briefly, one kg of SDJ was rinsed and soaked in 8 L of tap water overnight for rehydration and removal of excess minerals. Rehydrated SDJ was rinsed with clean tap water, chopped, and soaked in a 3 L citric acid solution (1.5% w/v) for 10 min. Then, SDJ was drained of excess citric acid solution, homogenized in a commercial grade blender (Model BL610, NINJA, SharkNinja Operating LLC, Needham, MA, USA) at medium and high power for 8 and 4 min, respectively. Afterwards, the mixture was further processed with an ultra-shearing homogenizer (Homogenizer 850, Fisherbrand, Fisher Scientific UK Ltd, Loughborough, UK) at 8000 rpm for 6 min then at 10000 rpm for 8 min, until a visible thin liquid was observed. Then, the liquified product was incubated at 60° C. for 4.5 h in a water bath (Model 2872, Precision, Thermo Electron Corporation, Waltham, MA, USA) to allow the hydrolyzation of the jellyfish collagen. Once the hydrolysis process had been finished, a dialysis procedure was performed to remove excess minerals. The dialysis was performed by placing 600 mL of liquid hydrolyzed jellyfish into regenerated cellulose dialysis tubes (cut 25-30 mm in length) (MWCO: 6-8 kD, Spectra/Por® 1 Dialysis Membrane, Spectrum Laboratories, Inc., Rancho Dominguez, CA) at room temperature. Then, the dialysis tubes were sealed with plastic clips and placed in 3 L of deionized water (DIW) which was used as the dialysis buffer. The water was continuously agitated/stirred to speed up the dialysis process. The saturated water was replaced with fresh DIW every 3 h until completion of dialysis, around 9 hours total (total dilution factor=$10^3$, total time of dialysis=9 h). The time frames selected were based on preliminary studies conducted in our lab (data not shown). Afterwards, the hydrolyzed and dialyzed jellyfish was frozen at −4° C. for 12 h and freeze-dried at −55° C. for 2 days then gradual increasing of the chamber temperature to 20° C. for 3 days was performed using a pilot-scale lyophilizer (Virtis, the Virtis Company, Gardiner, NY, USA). Then, freeze-dried samples were pulverized using an electric grain grinder mill (SLSY & MOONCOOL, Shanghai, China) to obtain the hydrolyzed and dialyzed SDJ powders (D-SDJ). Concurrently, hydrolyzed and un-dialyzed SDJ powders (H-SDJ) were prepared using the procedure described above (except the dialysis process) and used as the control. The powders were stored in a dry environment at room temperature until needed for analysis.

Physicochemical Properties of D-SDJ

Moisture and Water Activity ($a_w$)

Moisture content of the powders was determined by the AOAC Official Method 934.01 (AOAC, 2020) using an Isotemp® Vacuum Oven Model 281A (Thermo Fisher Scientific, Waltham, MA., USA). Water activity ($a_w$) was determined using an Aqualab water activity meter (Model Series 3 TE, Decagon Devices, Inc., Pullman, Wash., USA).

Ash and Mineral Analysis

The ash content of H-SDJ and D-SDJ was calculated by following the general AOAC Official Method for ash analysis, performed in triplicate (Marshall, 2010). In short, samples were weighed, and the program followed was set at 550° C. for 780 minutes. The samples were then taken out, weighed, and the ash content was calculated. While the mineral profile of both H-SDJ and D-SDJ powders was determined by an Inductively Coupled Plasma Mass Spectrometry (ICP-MS) method. The analysis was performed at the University of Georgia (UGA)—Soil, Plant, and Water Laboratory in Athens, GA.

Color

The color of the powders was measured using a Lab Scan XE Colorimeter (Hunter Associates Laboratory, Inc., Resbon, VA, USA) which was reported in CIE L.A.B color scales (L*, a*, b*). To determine the color, petri dishes were filled with the freeze-dried powders until their bottom was completely covered. Chroma and hue were quantified using Eqs. (1) and (2), previously described by Solval, Sundararajan, Alfaro, and Sathivel (2012).

$$\text{Chroma} = \left[(a^*)^2 + (b^*)^2\right]^{\frac{1}{2}} \tag{1}$$

$$\text{Hue} = \tan^{-1}\left(\frac{b^*}{a^*}\right) \tag{2}$$

Particle Size Distribution

Particle size analysis was conducted using a Particle Size Analyzer (Model PSA 1190, Anton Paar, Austria) equipped with laser diffraction. The freeze-dried powders were fed into the machines hoper and transported via Venturi/free fall to the analytical area. In this area, the powders were illuminated using three separate lasers from low to high angles, each laser simultaneously diffracted light which was read and analyzed by the equipment. In this study, a 10 second run time with dispersion parameters of 40% vibrator duty cycle, 40 Hz vibrator frequency, and 1200 mBar of air pressure was utilized. The whole light scatter pattern was collected and analyzed to calculate the particle size distribution in accordance with the Fraunhofer reconstruction mode which quantifies the angular distribution of backscattered light. Particle size distribution data was reported as $D_{10}$, $D_{50}$, and $D_{90}$ which is the average diameter of the particles at 10%, 50%, and 90% of the sample being tested, respectively.

Scanning Electron Microscopy (SEM)

SEM images of the powders was collected using the scanning electron microscope (1450 EP, Carl Zeiss MicroImaging, Thornwood, NY) located at the Georgia Electron Microscopy facility (Athens, GA). Powdered samples were first sputter-coated with gold then images were collected using an acceleration potential of 2 kV, which provided the greatest resolution of the sample morphologies. This process was previously used in our laboratory and described by Jiang, Dev Kumar, Chen, Mishra, and Mis Solval (2020).

Bulk Density

The bulk density was determined using the method previous described by Yihong, Yisheng, Geoff, Lirong, and William (2009) with slight modifications. Briefly, a 100 mL graduate cylinder was tared on an analytical balance then powder was filled to the 10 mL mark. The cylinder was taken off the balance and tapped 100 times. If the powder fell below the 10 mL mark then more powder was filled to reach the 10 mL mark and tapped 100 more times. This process was repeated until the tapped powder read 10 mL. At that point, the graduated cylinder with powder at the 10 mL mark was weighed. The weight of the powder (grams) was divided by the volume (10 mL) to receive the bulk density (g/cm$^3$), each performed in triplicate.

Crude Protein Analysis

Crude protein analysis was determined by following the AOAC Official Method 976.5 for the automated Kjeldahl method (AOAC, 2019). In short, crude protein was quantified by measuring the total nitrogen content after following a dry combustion method using a rapid N exceed nitrogen analyzer (Elementar, Langenselbold, Germany), performed in triplicate. A conversion factor of 5.8 was utilized to determined crude protein content (Binsi, Shamasundar, Dileep, Badii, & Howell, 2009; N. M. H. Khong et al., 2016).

Isoelectric Point ($I_p$) Determination

Isoelectric point of H-SDJ and D-SDJ was determined by following the method of J. Li et al. (2020) with slight modifications. In short, H-SDJ and D-SDJ powders were weighed and mixed with 2 M acetic acid to give a final concentration of 0.1 mg of powder per mL of acetic acid solution. After mixing, the solution was allowed to hydrate for at least 15 minutes then was incubated at 40° C. in a water bath for less than 15 minutes, swirling periodically. Then, the pH of the solution was adjusted from ~2.4 (initial) up to 6.0 using 1 M NaOH solution. Afterwards, the liquid mixture was injected into the Anton Paar Omega Cuvette number 225288 and placed into the zeta potential analyzer (Model Litesizer 500, Anton Paar, Austria). The parameters were a target temperature of 20° C., equilibration time of 1 minute, Smoluchowski equation, Henry factor of 1.50 and adjusting the solvent to acetic acid (refractive index of 1.3717, viscosity of 0.0011550, and relative permittivity of 6.20). Zeta potential (mV) readings were recorded at a given pH value.

Bloom Strength of Gelatin Gels Produced with Different Solid Concentrations of H-SDJ and D-SDJ at Different pH Values and Maturation Temperatures Bloom strength (g) of gelatin gels produced with H-SDJ and D-SDJ powders was determined by following the official method of the Gelatin Manufacturers Institute of America, Inc. (GMIA) (GMIA, 2019) with slight modifications. Gelatin gels were prepared in Bloom jars with three solid concentrations (5%, 6.67%, and 10% (w/w)) formulated with 5.63 g, 7.50 g, and 11.25 g of H-SDJ or D-SDJ and 106.9, 105.0, and 101.3 g of DIW, respectively. The samples were allowed to completely swell for 1-2 h at room temperature. Then, the pH of the sample was either kept at 2.4 or adjusted to 4.4 or 6.5 using a 1 M NaOH solution. These pH values were selected based on the results obtained for $I_p$ values of the H-SDJ and D-SDJ powders. Next, dissolution of powders was achieved by incubating the samples in a 65° C. water bath for 15 minutes, swirling periodically. Afterwards, the samples were allowed to temper at room temperature for 15 to 20 min. Finally, samples were incubated at three temperatures 4, 7, and/or 10° C. for 17±1 h to allow maturation and formation of gelatin gels. After maturation, a TA.XT Plus texture analyzer (Stable Micro Systems Ltd, Godalming, United Kingdom) was used to determine the Bloom strength (g) of the gelatins at 4 mm penetration depth. The parameters used were a 12.7 mm in diameter probe which depressed the surface of the gel by 4 mm at a speed of 1 mm/sec. The peak force in grams was recorded and is referred to as the Bloom strength of a gelatin (GMIA, 2019).

Statistical Analysis

All experiments and analyses were carried out in triplicate replication. The mean and standard deviations (SD) were calculated then statistical tests were run to determine if significant differences arose in the collected data. For Bloom strength results, a two-way Analysis of Variance (ANOVA) (two independent variables), and post-hoc Tukey's studentized range tests ($\alpha=0.05$) were employed; while for the rest of the data a one-way ANOVA and post-hoc Tukey's studentized range tests ($\alpha=0.05$) were conducted to determine the statistical significance of observed differences among the means. This was conducted using RStudio statistical software version 1.2.5033 (RStudio, Inc. Boston, MA, USA).

Results and Discussion

Physicochemical Properties of H-SDJ and D-SDJ

Moisture Content and $a_w$

The moisture content and $a_w$ of H-SDJ and D-SDJ was 4.03±0.13 g/100 g, 0.079±0.01 and 4.63±0.33 g/100 g, 0.060±0.01, respectively (Table 1). Although the $a_w$ of D-SDJ was similar to that of H-SDJ; H-SDJ had a significantly (P<0.05) lower moisture content compared to D-SDJ. Because of their low moisture and $a_w$ values, both H-SDJ and D-SDJ are considered shelf stable products. Currently, no studies have demonstrated how the removal of minerals of powdered foods may affect their moisture content and $a_w$. The lower moisture content values for the H-SDJ compared to the D-SDJ may suggest that the amount of water in the sample for a given mass was lower in H-SDJ. As salt concentration increases, research has shown that moisture content decreases (Boudhrioua, Djendoubi, Bellagha, & Kechaou, 2009). Thus, H-SDJ having significantly more minerals is likely driving out more moisture in the powder than in the D-SDJ. Water activity is a parameter used to determine the shelf stability of foods, in regards to microbial growth, by measuring the amount of free water available in a sample (Solval et al., 2012). Typically, dried foods ($a_w$ values<0.6) are considered shelf stable where microbial growth is limited, assuming no moisture absorption will occur during storage (Fellows, 2009).

TABLE 1

Characterization of H-SDJ and D-SDJ powders

| | | H-SDJ | D-SDJ |
|---|---|---|---|
| | Water activity ($a_w$) | 0.079 ± 0.01 | 0.060 ± 0.01 |
| | Ash (g/100 g, dry basis) | 56.17 ± 0.13 | 13.12 ± 0.41 *** |
| | Moisture (g/100 g, wet basis) | 4.03 ± 0.13 | 4.63 ± 0.33 * |
| | Bulk Density (g/cm$^3$) | 0.29 ± 0.00 | 0.037 ± 0.00 *** |
| | Crude Protein (%) | 31.77 ± 0.04 | 85.35 ± 1.28 *** |
| Color | L* | 70.91 ± 0.03 | 60.95 ± 0.01 ** |
| | a* | 1.31 ± 0.04 | 5.73 ± 0.04 *** |
| | b* | 8.78 ± 0.03 | 21.71 ± 0.04 *** |
| | Hue | 81.49 ± 0.29 | 75.21 ± 0.10 *** |
| | Chroma | 8.88 ± 0.03 | 22.45 ± 0.04 *** |
| Particle size analysis | D10 (μm) | 0.70 ± 0.03 | 5.80 ± 0.12 *** |
| | D50 (μm) | 6.46 ± 1.13 | 54.89 ± 0.54 *** |
| | D90 (μm) | 314.90 ± 3.61 | 251.60 ± 8.53 *** |
| | Mean (μm) | 99.42 ± 1.22 | 97.48 ± 2.60 |
| | Span | 49.62 ± 8.75 | 4.48 ± 0.12 *** |

†Values are means ± standard deviation (SD) of triplicate determinations.

††Rows with * signify significant difference (p < 0.05),  (p < 0.01), * (p < 0.001) between H-SDJ & D-SDJ.

H-SDJ = Gelatin powders produced with hydrolyzed salted, dried jellyfish; D-SDJ = Gelatin powders produced with hydrolyzed and dialyzed salted, dried jellyfish.

Color

Color was determined using the L* (lightness) a* (red/green), b*(blue/yellow) color scale. The color values of D-SDJ were significantly (P<0.05) different than those of H-SDJ (Table 1). The color results indicated that D-SDJ was darker, slightly redder and yellower than H-SDJ, which confirm the results obtained from the pictures of the powders presented in FIG. 2. It was observed that after dialysis, samples became darker. This may be due to the removal of salts, which show a whitish color, and the exposure of entrapped polyphenols and other pigments. Also, potential Maillard browning reactions may have taken place as reducing sugars and amine groups from the amino acids react and ultimately can cause the browning (Lueyot et al., 2020). Commonly, commercial gelatins have a color that ranges from pale yellow to a darker amber (Alfaro, Biluca, Marquetti, Tonial, & de Souza, 2014).

Ash Content and Mineral Profile

The ash content of D-SDJ was significantly (P<0.05) lower than that of H-SDJ (Table 1). Remarkably, D-SDJ had 76.6% less ash than H-SDJ. These results confirm the effectiveness of the dialysis process to remove excess minerals. According to Soria, Brokl, Sanz, and Martínez-Castro (2012), dialysis is defined as the diffusion of solutes and ultrafiltration of fluids that pass through a semi-permeable membrane. Preliminary studies conducted in our lab determined that 9 h of dialysis was sufficient to remove a majority of minerals present in H-SDJ. FIG. 1 shows the process used to turn SDJ into D-SDJ. As can be envisioned by one of ordinary skill in the art, the times, temperatures, and speeds shown in the figure may be modified slightly.

Table 2 shows the mineral profile of the H-SDJ and D-SDJ with the percent change in minerals. After dialysis, the reduction of minerals ranged from the lowest 46.2±12.59% in Cr up the highest of 98.6±0.30% for Na. Receiving a ~99% reduction in the Na content from ~239,205 to 3,310 (ppm, dry basis) demonstrates that the dialysis process was extremely effective at removing sodium. Contrary, numerous minerals reported an increase in concentration (e.g., P, S, Cu) but most notably Al was increased 21.2±6.32% to 5,464.68±276.62 (ppm, dry basis). Some minerals reported an increase in concentration for U-SDJ to H-SDJ and this phenomenon may have been observed because with much less sodium per known mass of sample, the concentrations of these minerals, most importantly Al, appeared to significantly increase. Currently, no research has looked into how Al binds in food but it is predicted that the Al may bind more tightly to the collagen proteins similar to how Al binds to proteins in the body like albumin and transferrin (D. Cheng, Wang, Xi, Cao, & Jiang, 2018). Thus, removing Al by dialysis was not very effective and may be why Al appeared to constantly increase from H-SDJ to D-SDJ. This study demonstrates that dialysis was very effective at removing Na and other minerals like Ca, K, Mg, etc. while not ideal for removing certain minerals like Al, P, S, and Cu. Although no research has reported the demineralization of jellyfish gelatin by dialysis, an interesting study demonstrated the successful demineralization of Sea Brim gelatins using Ethylenediaminetetraacetic acid (EDTA) for 12 h which reduced the mineral content of gelatins to 0.57±0.10 g/100 g from 59.8±0.3 g/100 g (Akagündüz et al., 2014). In another study on the demineralization of gelatins obtained from lizardfish (*Saurida* sp.) using a combination of NaCl and NaOH solutions reduced the ash content of gelatins while improving the gel strength (Wardhani, Rahmawati, Arifin, & Cahyono, 2017). Other studies have reported the successful demineralization of collagen and gelatins derived from grass carp fish scales, camel bone, and spotted golden goatfish scales using HCl (AL-Kahtani et al., 2017; Chuaychan, Benjakul, & Nuthong, 2016; Zhang, Xu, & Wang, 2011).

To the best of our knowledge, no reports have been conducted on the demineralization of jellyfish gelatins using a dialysis procedure.

TABLE 2

Mineral profile for H-SDJ and D-SDJ and the percent change in minerals from H-SDJ to D-SDJ.

| Mineral | Units | H-SDJ | D-SDJ | % change from H- to D-SDJ |
|---|---|---|---|---|
| Ca calcium | g/100 g d.b. | 0.09 ± 0.00 | <0.01*** | 93.5 ± 0.43 |
| K potassium | g/100 g d.b. | 0.09 ± 0.02 | 0.02 ± 0.00** | 84.7 + 5.81 |
| Mg magnesium | g/100 g d.b. | 0.13 ± 0.00 | <0.01*** | 92.0 ± 0.00 |
| P phosphorus | g/100 g d.b. | 0.11 ± 0.00 | 0.14 ± 0.01** | 22.0 ± 5.28 |
| S sulfur | g/100 g d.b. | 0.38 ± 0.01 | 0.53 ± 0.02*** | 42.6 ± 2.43 |
| Al aluminum | ppm, d.b. | 4,150.10 ± 25.87 | 5,464.68 ± 276.62** | 21.2 ± 6.32 |
| B boron | ppm, d.b. | <2.67 | <5.7 | CBD |
| Cd cadmium | ppm, d.b. | <1.06 | <2.28 | CBD |
| Cr chromium | ppm, d.b. | 17.47 ± 0.38 | 9.40 ± 2.12** | 46.2 ± 12.59 |
| Cu copper | ppm, d.b. | 17.26 ± 0.78 | 22.86 ± 1.52** | 32.6 ± 10.26 |
| Fe iron | ppm, d.b. | 195.58 ± 17.63 | 93.08 ± 2.47*** | 52.2 ± 3.71 |
| Mn manganese | ppm, d.b. | <2.65 | <5.7 | CBD |
| Mo molybdenum | ppm, d.b. | <1.32 | <2.85 | CBD |
| Na sodium | ppm, d.b. | 239,205 ± 5966.93 | 3,310.96 ± 655.32*** | 98.6 ± 0.30 |
| Ni nickel | ppm, d.b. | 14.13 ± 1.91 | <2.33* | CBD |
| Pb lead | ppm, d.b. | <3.39 | 13.95 ± 6.84 | CBD |
| Zn zinc | ppm, d.b. | 40.29 ± 7.93 | 14.33 ± 2.04*** | 63.0 ± 12.05 |

†Values are means ± standard deviation (SD) of triplicate determinations.

††Rows with * signify significant difference ($p < 0.05$), ($p < 0.01$), *($p < 0.001$) between H-SDJ & D-SDJ.

†††Values with "<" symbol were below detectable limits during the ICP-MS. CBD = could not be determined. H-SDJ = Gelatin powders produced with hydrolyzed salted, dried jellyfish; D-SDJ = Gelatin powders produced with hydrolyzed and dialyzed salted, dried jellyfish.

Particle Size Distribution

Figure 7:
FIG. 7 is a camera image of hydrolyzed, salted, dried jellyfish (H-SDJ) 7.5 g (left) and dialyzed-SDJ (D-SDJ) 7.5 g (right) in accordance with embodiments of the present disclosure.

Particle size distribution of H-SDJ and D-SDJ is shown in Table 1. The mean particle size ($D_{50}$, μm) of D-SDJ was 54.89±0.54 which is significantly ($P<0.05$) larger than that of the H-SDJ powder (6.46±1.13). Currently, there has been limited reports on how excess minerals in gelatin powders may reduce their particle size. One possible explanation for a larger particle size observed in D-SDJ may be related to its lower mineral content. As more minerals are released, this left a lighter/fluffier, less dense gelatin powder compared to the H-SDJ (FIG. 7). A significantly ($P<0.05$) lower bulk density in D-SDJ than H-SDJ illustrates that demineralization created a lighter product (Table 1). It was hypothesized that when the standardized grinding procedure is performed, the lower-density D-SDJ fills the chamber in a cloud-like form which does not grind the powder as fine while the more mineral dense H-SDJ is heavier thus being able to grind into a finer powder. Moreover, D-SDJ contains more proteinaceous material which may be more difficult to break down during the grinding process. Particle size data is an important parameter in food powders because it can give crucial information on behavior of food powders; for example, determining if a sample is free flowing or not, the ability to form stable emulsions/suspensions, its texture/mouthfeel in a product (gritty, chalky, sandy characteristics if too large) as well as potentially affecting the rheological properties of a product (Van der Meeren, Dewettinck, & Saveyn, 2004).

Microstructure

Figure 2:
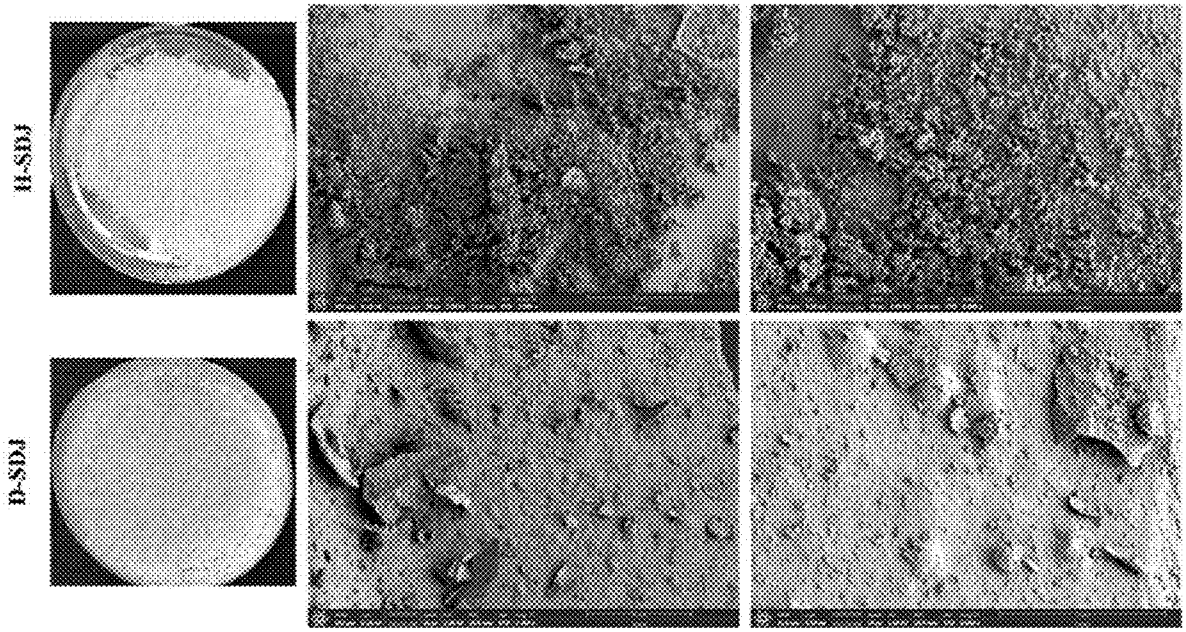
FIG. 2 provides camera images of powder (left) & scanning electron microscopy images (SEM) (right) of hydrolyzed salted, dried jellyfish (H-SDJ) and dialyzed salted, dried jellyfish (D-SDJ) in accordance with embodiments of the present disclosure.

The H-SDJ and D-SDJ microstructure was analyzed via SEM (FIG. 2). SEM imaging shows what appears to be chunks of protein surrounded by minerals in H-SDJ, this effect is not as prevalent in D-SDJ thus being a reason for its fluffier and lighter particles. This difference may have caused less fine grinding and a larger particle size to occur. The D-SDJ powders appeared to be either relatively large and flat-like structures with a small pore size (which suggests proteinaceous material) or extremely small dust-like particles (suggesting minerals). In comparison, the H-SDJ showed crumb-like, agglomerated groups with a porous structure. W. Wang et al. (2018) reported that gel powders containing less Na and Ca ions show smoother surfaces and smaller pore sizes. Moreover, it has been reported that small pore size in gelatin powders may lead to the absorption of higher quantities of water which serves to texturize, stabilize, gelatinize, or give an emulsifying effect to the gelatins (Abdelhedi et al., 2019). After demineralization of spotted golden goatfish scales using an HCl treatment, the scales appeared to become less rigid and became more porous which suggests that minerals were removed (Chuaychan et al., 2016). The agglomerated clumps were hypothesized to be NaCl which may in turn affect the strength of the gelatin due to the proteinaceous material being completely covered/surrounded. In the D-SDJ SEM images, it can be observed that a majority of these clumps have been removed after dialysis and what is left is the flat-like proteinaceous material that used to be surrounded by these clumps of presumably minerals. With the removal of these minerals, it was believed that freeing more proteinaceous material would allow for improvement in the Bloom strength of the resultant gelatin gels.

Bulk Density and Crude Protein Content

Bulk density is a measure of sample mass divided by its volume (Cheng et al., 2008). The H-SDJ and D-SDJ bulk density (g/cm$^3$) was 0.29±0.00 and 0.037±0.00, respectively (Table 1). According to the USDA (2021), loose, well-aggregated porous materials rich in organic matter, like proteins, tend to have a lower bulk density. The D-SDJ was significantly ($P<0.05$) less dense than the H-SDJ (FIG. 7). The less dense (lighter/fluffier) nature of the D-SDJ correlates with the mineral removal as ~77% of the minerals were removed. Using the SEM images (FIG. 2), it is hypothesized that with more minerals there is less space for air to be trapped within the product while removing minerals produced more open space thus allowing more air and producing the significantly small bulk density in D-SDJ. Brizzi, Funiciello, Corbi, Di Giuseppe, and Mojoli (2016) mentioned that gelatin density increases with increasing a salt concentration. Similar results were observed where fish gelatin alone observed a bulk density of 0.77 g/cm$^3$ while the addition of pectin significantly increased the bulk density (Cheng et al., 2008). Another study demonstrated how fish gels had significantly lower bulk density (0.127-0.142 g/cm$^3$) measurements than starch gels (0.411-0.523 g/cm$^3$) (Y. Wang, Zhang, & Mujumdar, 2013). However, no studies have reported how the bulk density of jellyfish gelatin is affected by demineralization.

Additionally, the crude protein content (%) of H-SDJ and D-SDJ was 31.77±0.04 and 85.35±1.28, respectively (Table 1). As the minerals were removed, discussed above, this allowed for the crude protein to become more concentrated which led to the significantly ($P<0.05$) larger amount of protein observed in the D-SDJ. This trend was continued from the original SDJ as the crude protein (g/100 g, dry basis) for the oral arms was 7.96±0.55 while the umbrellas were 6.43±0.67, based on a previous study. This demonstrates that after the washing, soaking and demineralization steps this caused removal of predominately minerals while concentrating the proteins that were present in the jellyfish. Research found that desalted ready-to-eat cannonball jellyfish had a protein content of ~4-5% (Hsieh, Leong, & Rudloe, 2001). Another study reported the crude protein (g/100 g, dry mass) of three species of jellyfish *A. hardenbergi, R. hispidum*, and *R. esculentum* and they ranged from 21-38 for the umbrella and 33-53 for the oral arms (N. M. H. Khong et al., 2016). This demonstrates that the H-SDJ being produced has a protein content within the range of three different species of jellyfish. To our knowledge, no research has demonstrated how demineralization affects crude protein content.

Isoelectric Point of H-SDJ and D-SDJ

Figure 3:
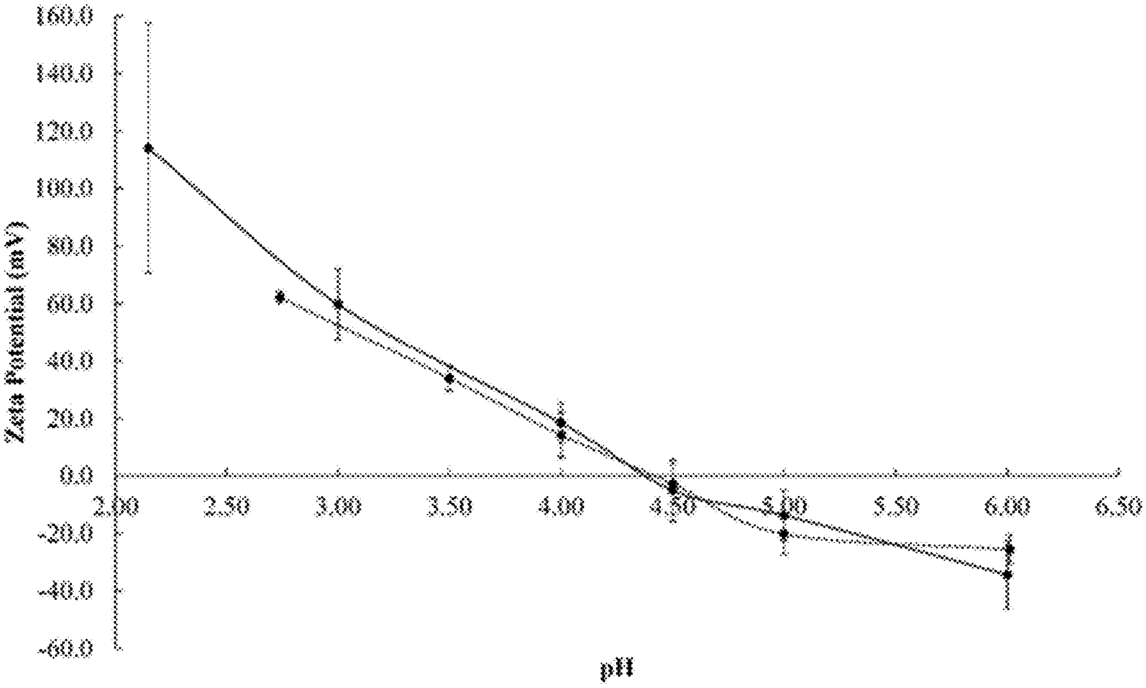
FIG. 3 is a graph showing the Zeta potential (mV) values of hydrolyzed salted, dried jellyfish (H-SDJ) (solid) and dialyzed-SDJ (D-SDJ) (dashed) at different pH values.

The $I_p$ is defined as the pH at which the surface charge of a protein is zero (Barzideh, Latiff, Gan, Benjakul, & Karim, 2014). Measuring $I_p$ of proteinaceous material is normally accomplished by zeta potential determinations. Furthermore, collagen proteins with zeta potential values closer to zero ($I_p$) form aggregates due to an increase in hydrophobic interactions between the collagen molecules in the solution (Ahmad, Benjakul, & Nalinanon, 2010; J. Li et al., 2020). The zeta potential values of H-SDJ and D-SDJ at different pH conditions is shown in FIG. 3. It can be observed that as pH was increased from ~2.4 to 6.0 the zeta potential values (mV) of the powders decreased. For both the H-SDJ and D-SDJ, they were essentially the same where they were positively charged from their initial pH's until ~4.4 then were negatively charged thereafter. Therefore, it was determined that the $I_p$ for H-SDJ and D-SDJ was approximately 4.4. It has been reported that most collagens have an $I_p$ between 6 to 9 and this variation in $I_p$ is related to the amino acid composition of collagen (J. Li et al., 2020). Barzideh et al. (2014) reported an $I_p$ for the Ribbon jellyfish (*Chrysaora* sp.) close to 6.64. Furthermore, J. Li et al. (2020) reported that lower Ips of collagen molecules may be due to a higher concentration of acidic amino acids, specifically glutamic acid. Interestingly, N. M. Khong et al. (2018) reported the $I_p$ values of collagen from jellyfish *Acromitus hardenbergi* to be 4.92 for the bell and 5.40 for the oral arms. Meanwhile, the $I_p$ of collagen from sea cucumber (*Acaudina molpadioides*) was 4.25 (J. Li et al., 2020). It has been reported that cold-water fish gelatin extracted from skins, appeared to be more stable at its $I_p$ ~4.5 than at pH 3.0 (Cheng et al., 2008). Therefore, our team hypothesized that the pH of the resultant gelatin gels may influence their Bloom strength.

Bloom Strength of Gelatin Gels Produced with H-SDJ and D-SDJ

The resistance or Bloom strength is a measure of a gels compressibility, firmness, consistency, and hardness at a given temperature and it is measured by the force in grams to depress a specific depth under normal conditions (Kempka, Souza, Ulson de Souza, Prestes, & Ogliari, 2014). Factors that been known to affect Bloom strength of gels are solid concentration, mineral content, specifically NaCl, maturation temperature, and pH (Chatterjee & Bohidar, 2006; Choi & Regenstein, 2000; Kamel & Deman, 1977). Gelatin gels were created at various solid concentrations of H-SDJ and/or D-SDJ, pH values, and maturated at different temperatures to determine how varying different parameters effects the gelatin strength of the novel jellyfish gelatins. The original Bloom value of H-SDJ tested at 10° C. maturation temperature, pH=2.4, 6.67% solids was 3.4 g.

Effect of Demineralization

The effect of removing minerals from the H-SDJ to produce D-SDJ by a dialysis method had markedly increased the Bloom strength of the jellyfish gelatin gels (FIGS. 4A-4C, 5A-5C, and 6A-6C). Regardless of the parameters being tested (solid concentration, maturation temperature, and pH), the Bloom strength (g) of the gelatin gels produced with D-SDJ was significantly (P<0.05) higher than that of gelatin gels produced with H-SDJ.

It is believed that the higher Bloom strengths observed in gelatin gels produced with D-SDJ was due to the significant reduction of minerals, especially sodium (Na), during the dialysis process. More than 96% of the Na present in H-SDJ was removed by dialysis (Table 2). Previous studies have shown that the removal of Na may impact the functionality of the resultant gelatin gels. For example, the addition of NaCl in concentrations of 0.5 to 2% was found to reduce the strength and stiffness of gels produced from protein isolates which is speculated to be due to delayed structure development and this was not seen with the addition of $CaCl_2$ signifying that the sodium ions caused the weaker gels (Ipsen, 1997). Similar findings were reported when NaCl was added to gelatin gels produced with added dextran dialdehyde T-70, where the salts caused a decrease in ionic interactions within the gelatin matrix (Schacht et al., 1993). Another study reported that increasing salt concentrations soften the resultant gelatin gels similar to raising its temperature as the salt acts to inhibit/interfere with the gels ability to form electrostatic interactions, likely hydrogen bonding, thus causing softening of the gelatin to occur (Chatterjee & Bohidar, 2006). Since H-SDJ contains high quantities of minerals, the results obtained in this study suggest that the excess minerals may interfere in the formation strong gel networks. Increasing salt concentrations was shown to decrease Bloom strength of multiple types of gelatin gels (Choi & Regenstein, 2000). This has been further backed up in a study that found that salt weakens a gels structure, specifically the difference between rigidity (G') and viscosity (G") proportionally decreases with increasing salt concentrations (Brizzi et al., 2016). Brizzi et al. (2016) deemed that highly concentrated salted gelatins have quasi-viscoelastic behavior, a theory used to model viscoelasticity of soft tissues (Kohandel, Sivaloganathan, & Tenti, 2008).

Contrary to some assumptions that all sodium removal is good for gel strength, research has also shown that small amounts of minerals may improve the functionality of gelatin gels. For example, gelatin gels derived from Lizardfish (*Saurida* Spp.) prepared with 0.8% NaCl and 0.5% NaOH showed higher gel strengths over various evaluated conditions using less NaCl (Wardhani et al., 2017). Another study reported that the addition of salt at 1.5% had a shielding or screening effect on protein and pectin molecules which prevented it from coalescing (Cheng et al., 2008). On the other hand, looking at the second most predominant mineral in H-SDJ and D-SDJ (Al), researchers found that the addition of aluminum potassium sulfate acted to increase the mechanical strength of a gelatin with up to ~10% NaCl concentration (Siimon, Mõisavald, Siimon, & Jarvekulg, 2015). Given that Na and Al are present in higher proportions in D-SDJ (compared to other minerals), further research will need to be conducted to determine the effect that these minerals have at different concentrations on the physicochemical properties of the resultant jellyfish gelatin gels.

Effect of Solid Concentration

Figure 4A:
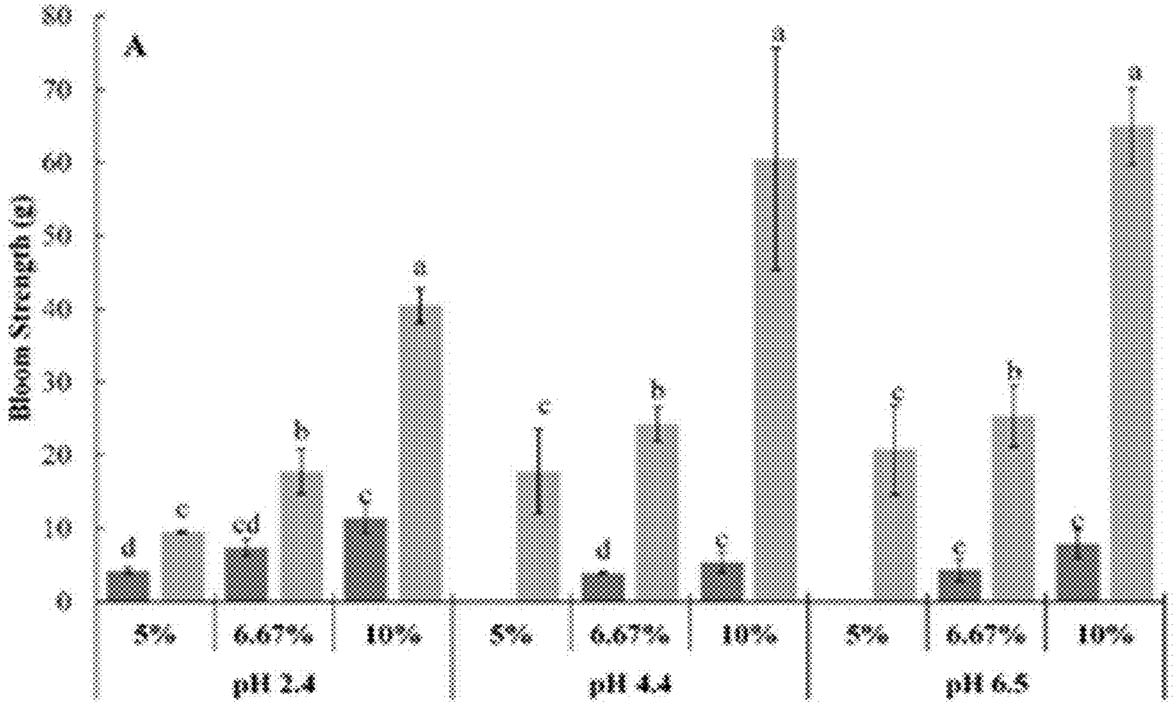
FIGS. 4A-4C illustrate the effect of solid concentration (%) on Bloom strength (g) of jellyfish gelatin gels (dark=H-DSJ; light=D-SDJ) maturated at different temperatures (FIG. 4A=4° C.
Figure 4B:
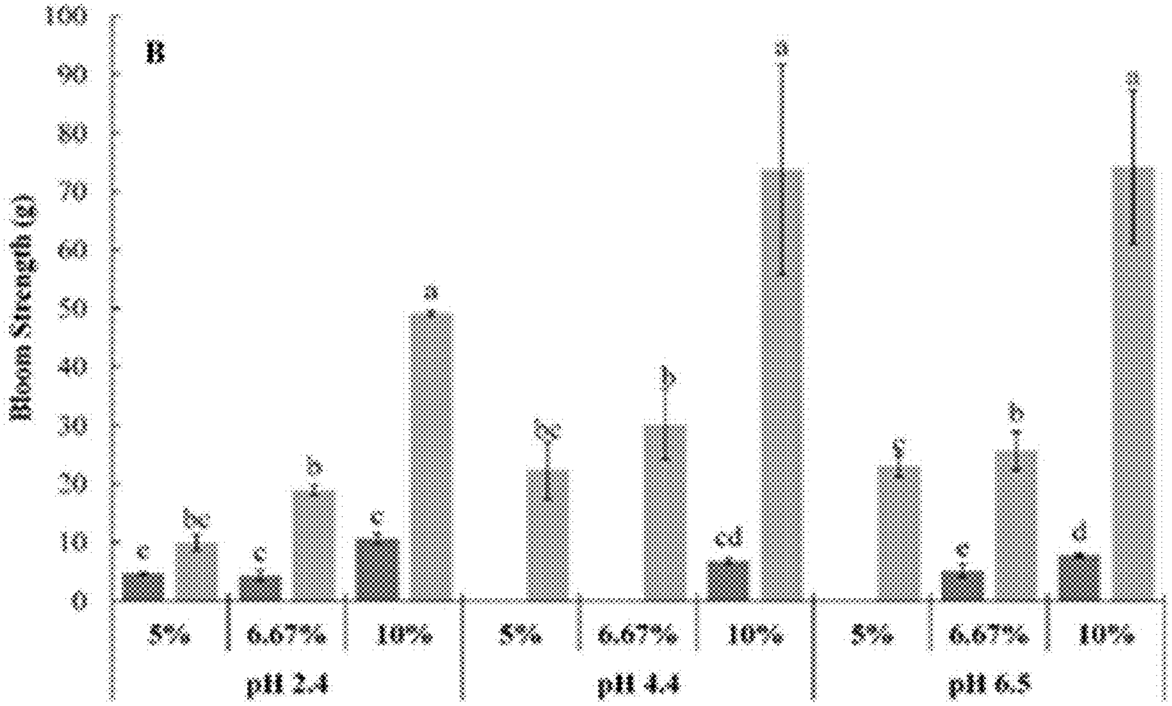
Figure 4C:
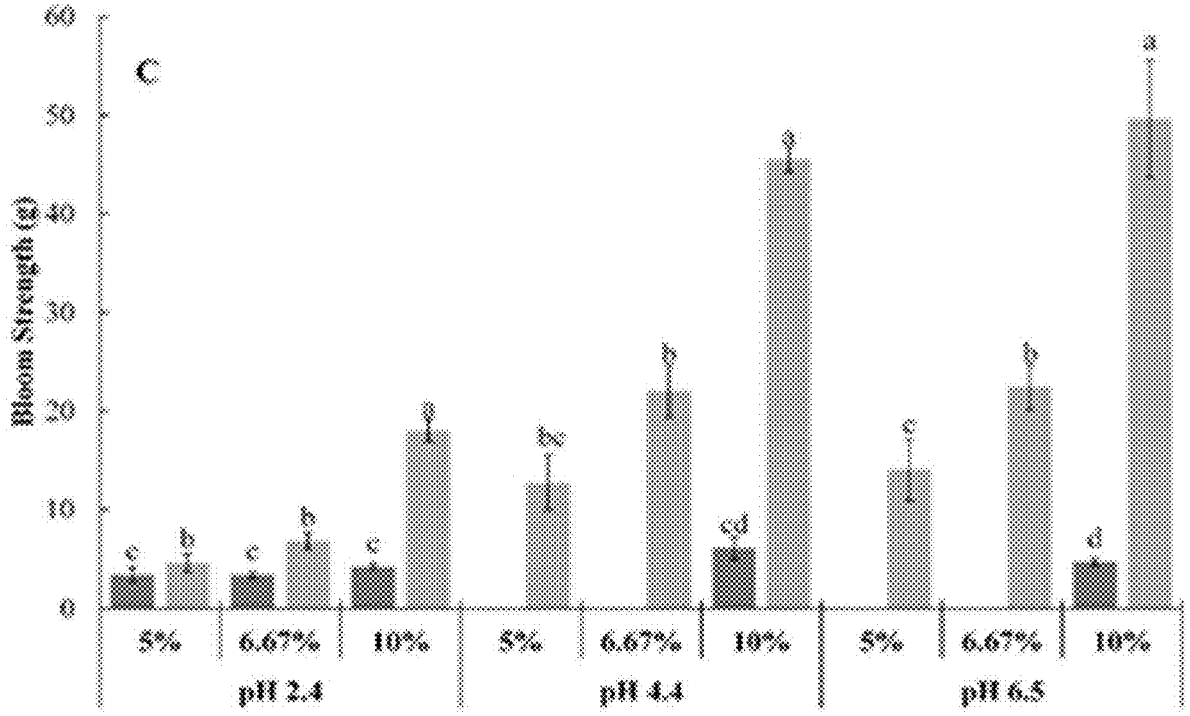

Typically, higher solid concentrations produce stronger gelatin gels and this pattern was observed in gelatin gels produced with H-SDJ and D-SDJ at 4° C. pH 2.4 (FIG. 4A). Choi and Regenstein (2000) demonstrated that stronger fish and mammalian gelatin gels are produced with higher solid concentrations. At incubation temperatures of 4, 7 and 10° C., similar trends were observed for gelatin gels produced with both H-SDJ and D-SDJ (FIGS. 4A, 4B and 4C). In general gelatins gels produced with 10% solid concentration showed significantly (P<0.05) higher Bloom strengths than those produced with 5% and 6.67% solids. Meanwhile, similar gel strengths were achieved with gelatin gels produced with 5% and of 6.67% solid concentration. At 10° C. maturation temperature, increasing the solid concentration of gelatin gels produced with D-SDJ from 6.67 to 10% increased their Bloom strength by 264, 206, and 221% when they were prepared at pH of 2.4, 4.4 and 6.5, respectively (FIG. 4C). Similar results were observed when testing the Bloom strength of gelatin gels produced from jellyfish *Rhopilema hispidum* where low gel strengths were observed at solid concentrations lower than 5%, then Bloom strength drastically improved when gels were prepared at 5 and 6.67% solids (Cho, Ahn, Koo, & Kim, 2014). Because of differences in the amino acid profile of collagen obtained from porcine, bovine, the jellyfish *Rhopilema hispidum* and cannonball jellyfish, specifically in hydroxyproline, proline and glycine, the resultant gelatin gels produced at different solid concentrations will show different Bloom strengths (Cho et al., 2014; Gómez-Guillén et al., 2002). In short, the strength of gelatin gels depends on solid concentration whereas a gel with less solids tends to act more like a liquid while at higher solids may behave more as semi-solid material (Kamel & Deman, 1977). Additionally, higher concentrations have been associated with a faster gelation process due to second order kinetics (Djabourov, Nishinari, & Ross-Murphy, 2013).

Effect of pH

Figure 5A:
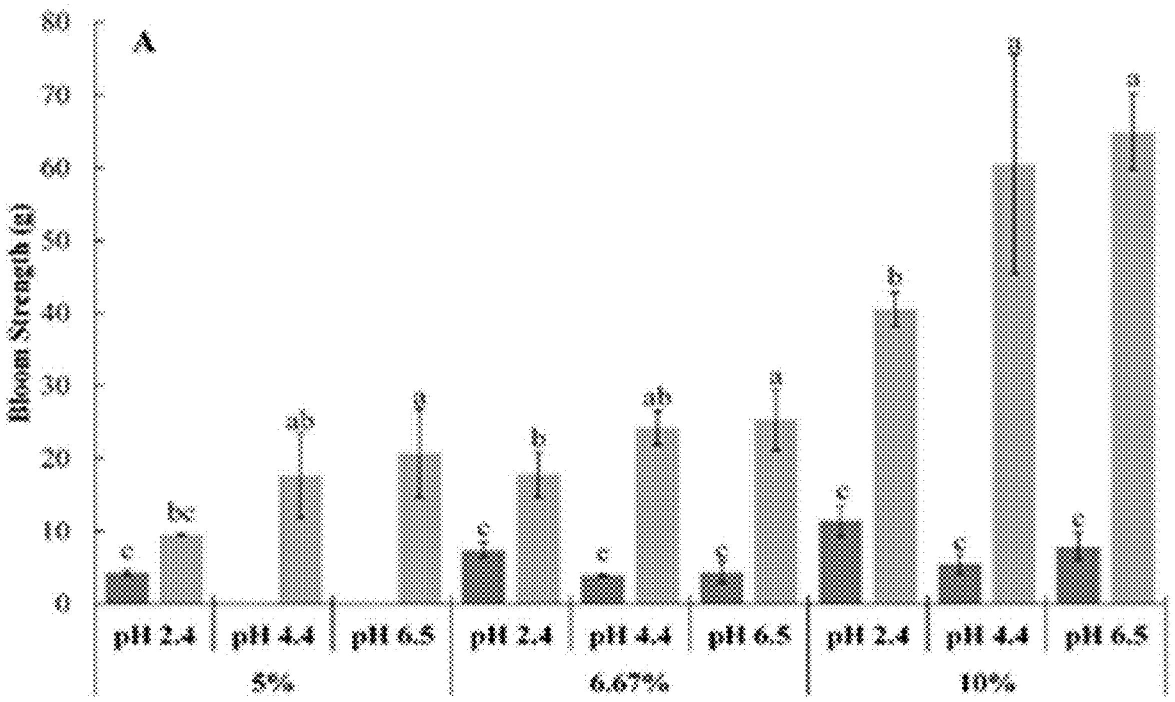
FIGS. 5A-5C illustrate the effect of pH on Bloom strength (g) of jellyfish gelatin gels (dark=H-DSJ; light=D-SDJ) maturated at different temperatures (FIG. 5A=4° C.
Figure 5B:
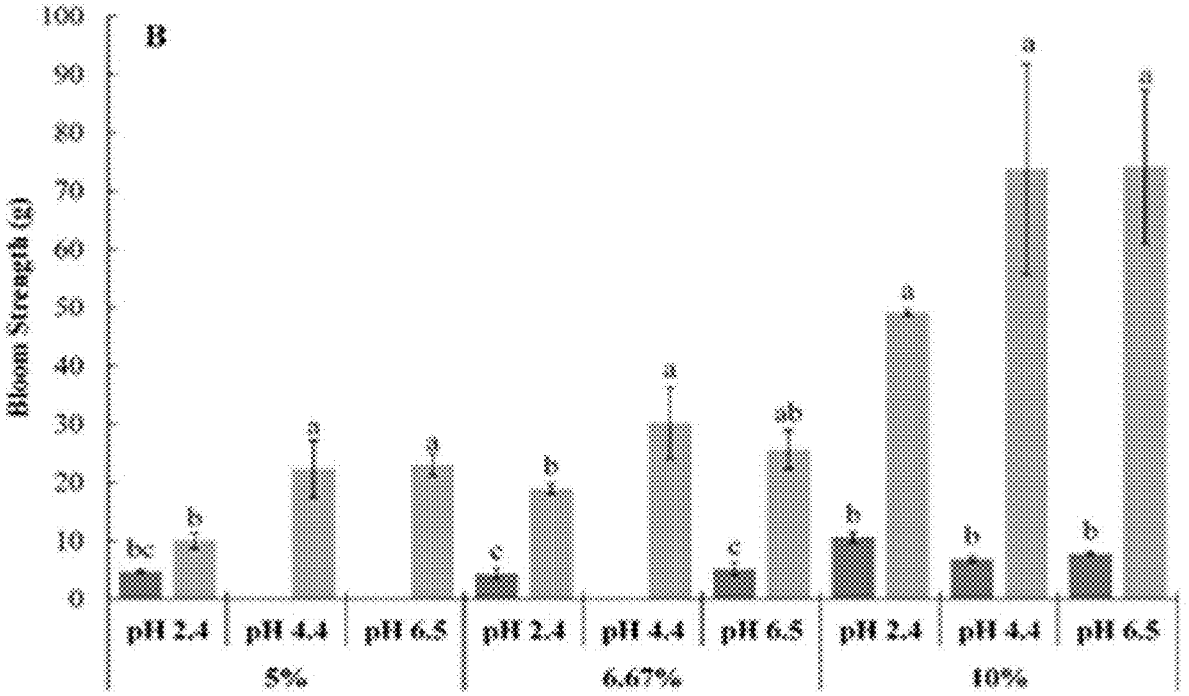
Figure 5C:
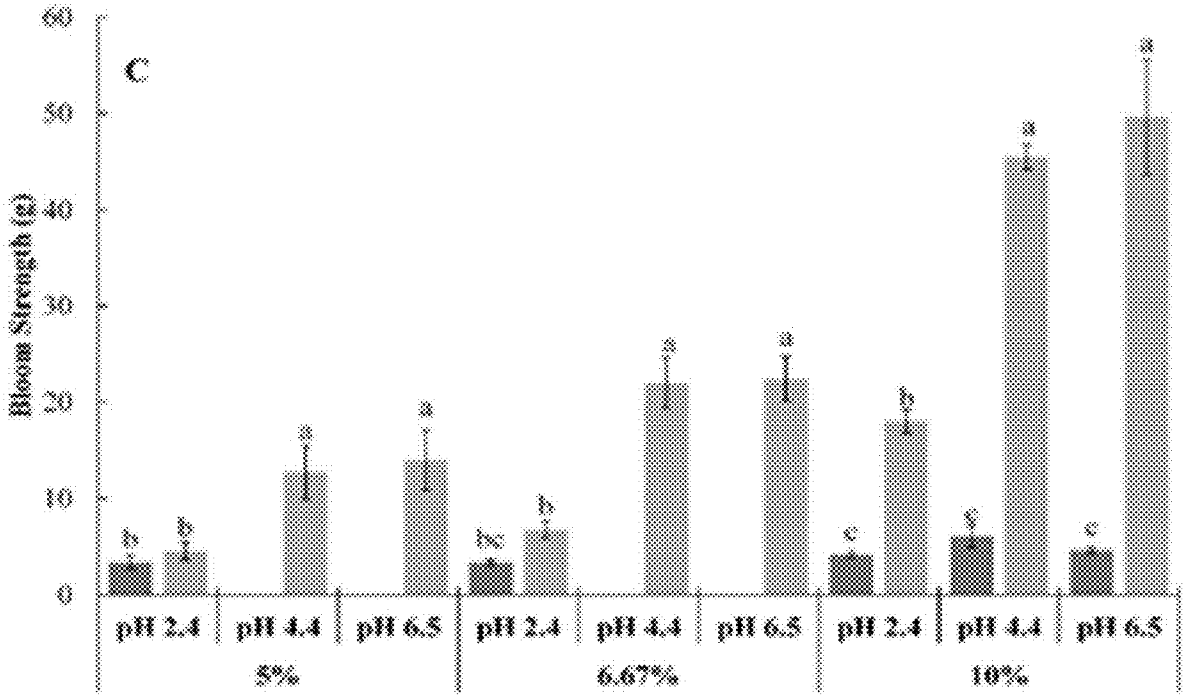

Adjustments to the pH of the gelatin gels produced with H-SDJ and D-SDJ were performed to understand pH's effect on the Bloom strength (FIGS. 5A-5C). Gelatin gels were prepared with H-SDJ and D-SDJ at three pH conditions including pH 2.4 (original), 4.4 (isoelectric point) and 6.5.

The results revealed that gelatin gels with significantly ($P<0.05$) higher Bloom strengths were produced at pH values of 4.4 and 6.5 regardless of the solid concentration and maturation temperatures (FIG. 5A-5C). These findings may suggest that stronger gelatin gels are produced at pH values close or higher than the $I_p$ of the jellyfish collagen. The effect of pH on Bloom strength was more evident with gels prepared with 10% solids (FIG. 5A-5C). Furthermore, at 10° C. maturation temperature, increasing the pH of gelatin gels produced with D-SDJ from 2.4 to 4.4 increased their Bloom strength by 276%, 323%, and 252% when they were prepared with 5, 6.67, and 10% solids, respectively (FIG. 5C).

In short, if using a higher maturation temperature and a stronger gelatin is desired then pH adjustments to a more neutral pH, like 6.5, may positively affect the strength of the gelatin if using a solids content of 6.67% or higher. Researchers demonstrated that gel strengths decreased significantly below a pH of 4 and above pH of 8 while maximum gel strength occurred between pH 4 and 8 (Choi & Regenstein, 2000). Similar results were seen that as pH was decreased (below 4), weaker gels were observed due to increased degradation of the proteins (Papadopoulou, Rizos, & Aggeli, 2016). Research found that increasing the pH towards the isoelectric point has been shown to form a more compact and stiffer gelatin network (Gudmundsson & Hafsteinsson, 1997).

Effect of Maturation Temperature

Figure 6A:
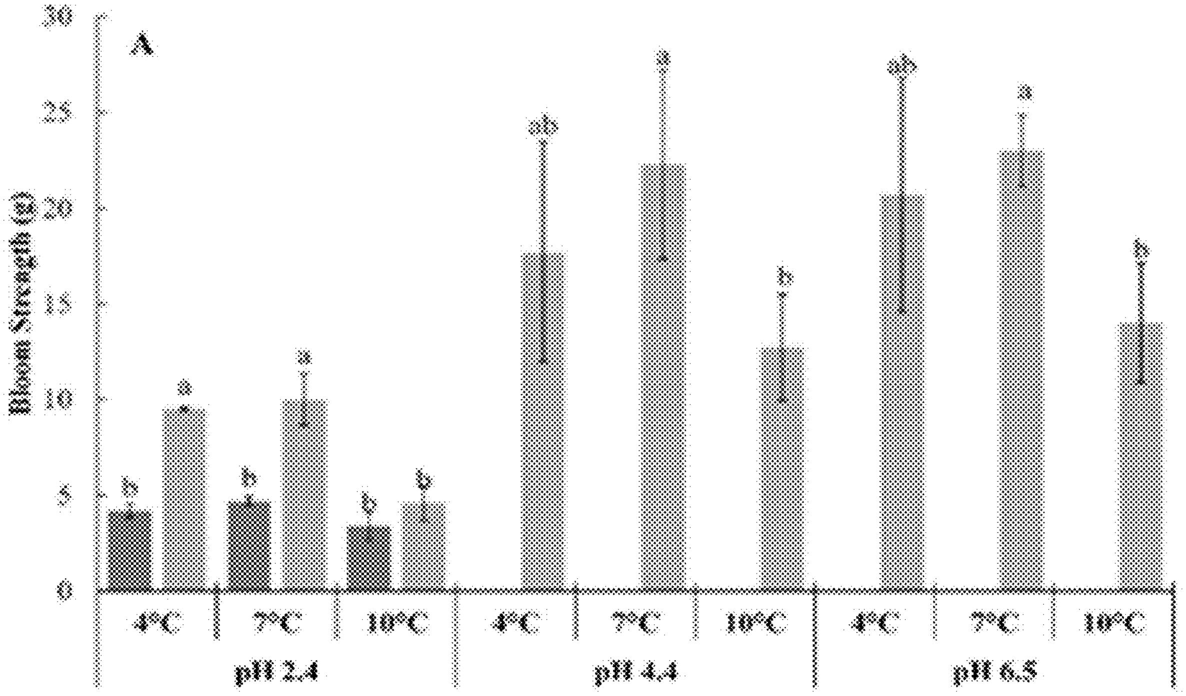
FIGS. 6A-6C illustrate the effect of maturation temperature (C) on Bloom strength (g) of jellyfish gelatin gels (dark=H-DSJ; light=D-SDJ) prepared at different solid concentrations (FIG. 6A=5%.
Figure 6B:
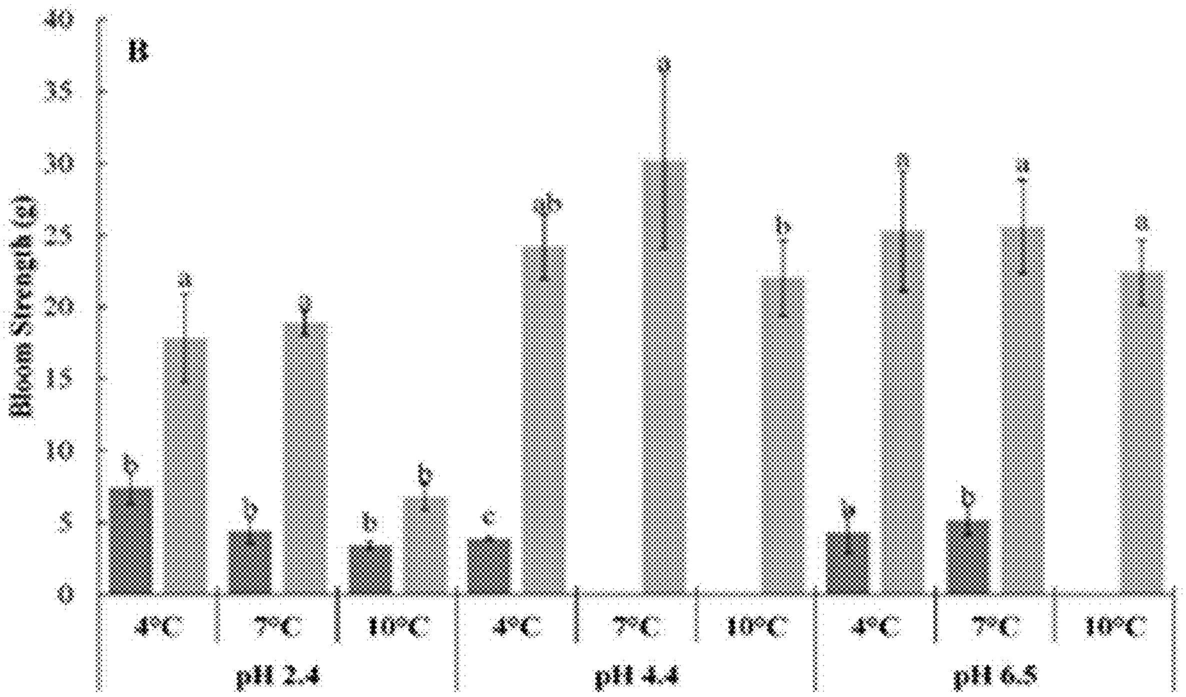
Figure 6C:
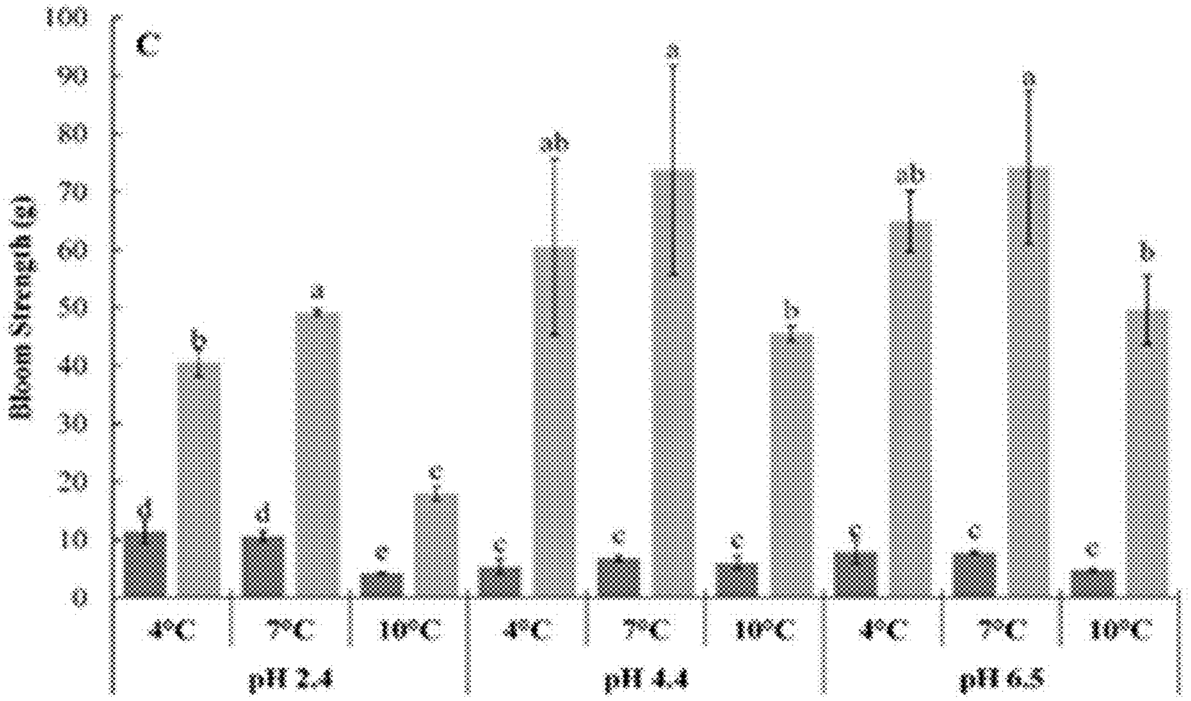

Effect of maturation temperatures on the Bloom strength of gelatin gels produced with H-SDJ and D-SDJ at varying percent solids and pH's is shown in FIGS. 6A-6C. The three maturation temperatures that were utilized were 4, 7, and 10° C. In general, gelatin gels maturated at 4 and 7° C. had significantly ($P<0.05$) higher Bloom values than those maturated at 10° C. It is believed that these results may be due to 10° C. being closer to the gelling and melting temperatures of the gelatin gels. The novel jellyfish gelatins presented in this study were developed using acidic hydrolysis treatment which likely formed a Type A gelatin. Research has shown that lower maturation temperatures enhance Type A gelatin gel formation while destabilizing occurs at higher temperatures (Chatterjee & Bohidar, 2006). Furthermore, at 6.67% solid concentration, increasing the maturation temperature of gelatin gels produced with D-SDJ from 7 to 10° C., reduced their Bloom strength by 64, 28, and 12% when they were prepared at pH of 2.4, 4.4 and 6.5, respectively (FIG. 6B). This may suggest that increasing the pH of gelatin gels can improve their stability at higher maturation temperatures closer to their melting points. In short, if using a higher maturation temperature, like 10° C., with a solids content from 5 to 10% then using a pH near the gelatins isoelectric point can improve the gelatin as if lower maturation temperatures were being used. Choi and Regenstein (2000) reported similar trends to what was observed in this research at pH 2.4 for 5 and 6.67% solids where Bloom decreased at a higher maturation temperature. However; their research did not take into consideration how pH and concentration in addition to maturation temperature may affect the Bloom strength of the resultant gelatin gels.

Conclusion

The production of a novel gelatin powder from salted, dried jellyfish was successfully achieved through acid hydrolysis, demineralization by dialysis, and freeze-drying. The dialysis process was able to remove ~77% of the minerals present in hydrolyzed salted, dried jellyfish. The hydrolyzed and dialyzed gelatin powders were shelf stable with low moisture content and water activity (<0.2) values. The demineralization process significantly increased the Bloom strength of the resultant jellyfish gelatin gels regardless of the pH, solid concentration, and maturation temperature utilized. Moreover, demineralized jellyfish gelatin gels produced with 10% solid concentration, at pH 4.4 and 6.5 and maturated at temperatures of 4° C. had higher Bloom strengths (>64-74 g). This was a tremendous improvement compared to gelatins gels produced with 10% solid concentration, at pH 4.4 and 6.5 and maturated at temperatures of 4° C. using hydrolyzed, un-dialyzed jellyfish gelatin powders (Bloom strengths<8 g). Stronger gelatin gels maturated at 4 and 7° C., with 10% solids and pH values of 4.4 and 6.5. Also, it was demonstrated that a pH near the gelatins isoelectric point produced no significant differences in the gel strength from 4 to 10° C. at 5 to 10% solids while at a low pH values, differences arose. The study successfully demonstrated that gelatin powders with low mineral content can be produced from salted, dry jellyfish which can potentially be used as a functional ingredient in numerous food applications.

REFERENCES

Abdelhedi, O., Jridi, M., Nasri, R., Mora, L., Toldrá, F., & Nasri, M. (2019). Rheological and structural properties of Hemiramphus far skin gelatin: Potential use as an active fish coating agent. *Food Hydrocolloids,* 87, 331-341. doi: https://doi.org/10.1016/j.foodhyd.2018.08.005

Ahmad, M., Benjakul, S., & Nalinanon, S. (2010). Compositional and physicochemical characteristics of acid solubilized collagen extracted from the skin of unicorn leatherjacket (*Aluterus monoceros*). *Food Hydrocolloids,* 24 (6), 588-594. doi: https://doi.org/10.1016/j.foodhyd.2010.03.001

Akagündüz, Y., Mosquera, M., Giménez, B., Alemán, A., Montero, P., & Gómez-Guillén, M. C. (2014). Sea bream bones and scales as a source of gelatin and ACE inhibitory peptides. *LWT—Food Science and Technology,* 55 (2), 579-585. doi: https://doi.org/10.1016/j.lwt.2013.10.026

AL-Kahtani, H. A., Jaswir, I., Ismail, E. A., Ahmed, M. A., Monsur Hammed, A., Olorunnisola, S., & Octavianti, F. (2017). Structural characteristics of camel-bone gelatin by demineralization and extraction. *International journal of food properties,* 20 (11), 2559-2568.

Alfaro, A. T., Biluca, F. C., Marquetti, C., Tonial, I. B., & de Souza, N. E. (2014). African catfish (Clarias gariepinus) skin gelatin: Extraction optimization and physical-chemical properties. *Food Research International,* 65, 416-422. doi: https://doi.org/10.1016/j.foodres.2014.05.070

AOAC. (2019). *Official Methods of Analysis* (21st ed.): AOAC International.

AOAC. (2020). AOAC Official Method 934.01. Retrieved from http://www.eoma.aoac.org/methods/info.asp?ID=32550

Barzideh, Z., Latiff, A. A., Gan, C. Y., Benjakul, S., & Karim, A. A. (2014). Isolation and characterisation of collagen from the ribbon jellyfish (*C hrysaora sp.*). *International Journal of Food Science & Technology,* 49 (6), 1490-1499.

Binsi, P. K., Shamasundar, B. A., Dileep, A. O., Badii, F., & Howell, N. K. (2009). Rheological and functional properties of gelatin from the skin of Bigeye snapper (*Priacanthus hamrur*) fish: Influence of gelatin on the gel-forming ability of fish mince. *Food Hydrocolloids,* 23 (1), 132-145. doi: https://doi.org/10.1016/j.foodhyd.2007.12.004

Borza, A. D., Annan, N. T., Moreau, D. L., Allan-Wojtas, P. M., Ghanem, A., Rousseau, D., . . . . Hansen, L. T. (2010). Microencapsulation in genipin cross-linked gelatine-maltodextrin improves survival of *Bifidobacterium adolescentis* during exposure to in vitro gastrointestinal conditions. Journal of Microencapsulation, 27 (5), 387-399.

Boudhrioua, N., Djendoubi, N., Bellagha, S., & Kechaou, N. (2009). Study of moisture and salt transfers during salting of sardine fillets. *Journal of Food Engineering,* 94 (1), 83-89. doi: https://doi.org/10.1016/j.jfoodeng.2009.03.005

Brizzi, S., Funiciello, F., Corbi, F., Di Giuseppe, E., & Mojoli, G. (2016). Salt matters: How salt affects the rheological and physical properties of gelatine for analogue modelling. *Tectonophysics,* 679, 88-101. doi: https://doi.org/10.1016/j.tecto.2016.04.021

Chatterjee, S., & Bohidar, H. (2006). Effect of salt and temperature on viscoelasticity of gelatin hydrogels. *Journal of Surface Science and Technology,* 22(1/2), 1.

Cheng, D., Wang, X., Xi, Y., Cao, J., & Jiang, W. (2018). Identification of the Al-binding proteins that account for aluminum neurotoxicity and transport in vivo. *Toxicology research,* 7 (1), 127-135.

Cheng, L. H., Lim, B. L., Chow, K. H., Chong, S. M., & Chang, Y. C. (2008). Using fish gelatin and pectin to make a low-fat spread. *Food Hydrocolloids,* 22 (8), 1637-1640. doi: https://doi.org/10.1016/j.foodhyd.2007.10.006

Cho, S., Ahn, J.-R., Koo, J.-S., & Kim, S.-B. (2014). Physicochemical properties of gelatin from jellyfish *Rhopilema hispidum. Fisheries and aquatic sciences,* 17 (3), 299-304.

Choi, S. S., & Regenstein, J. (2000). Physicochemical and sensory characteristics of fish gelatin. *Journal of Food Science,* 65 (2), 194-199.

Chuaychan, S., Benjakul, S., & Nuthong, P. (2016). Element distribution and morphology of spotted golden goatfish fish scales as affected by demineralisation. *Food Chemistry,* 197, 814-820.

Djabourov, M., Nishinari, K., & Ross-Murphy, S. B. (2013). *Physical gels from biological and synthetic polymers*: Cambridge University Press.

Etxabide, A., Urdanpilleta, M., Gómez-Arriaran, I., De La Caba, K., & Guerrero, P. (2017). Effect of pH and lactose on cross-linking extension and structure of fish gelatin films. *Reactive and Functional Polymers,* 117, 140-146.

Evans, D. R., Romero, J. K., & Westoby, M. (2009). *Chapter 9 Concentration of proteins and removal of solutes* (Vol. 463).

Fellows, P. J. (2009). 16-Dehydration. In P. J. Fellows (Ed.), *Food Processing Technology* (*Third Edition*) (pp. 481-524): Woodhead Publishing.

GMIA. (2019). Standard Testing Methods for Edible Gelatin. *Gelatin Manufacturers Institute of America,* 9-12. Retrieved from http://www.gelatin-gmia.com/uploads/1/1/8/4/118450438/gmia_official_methods_2019.pdf Gómez-Guillén, M. C., Turnay, J., Fernández-Díaz, M. D., Ulmo, N., Lizarbe, M. A., & Montero, P. (2002). Structural and physical properties of gelatin extracted from different marine species: a comparative study. *Food Hydrocolloids,* 16 (1), 25-34. doi: https://doi.org/10.1016/S0268-005X (01) 00035-2

Gudmundsson, M., & Hafsteinsson, H. (1997). Gelatin from cod skins as affected by chemical treatments. *Journal of Food Science,* 62 (1), 37-39.

Hsieh, Y., Leong, F., & Rudloe, J. (2001). Jellyfish as food. *Hydrobiologia,* 451, 11-17. doi: 10.1023/A:1011875720415

Ipsen, R. (1997). Uniaxial Compression of Gels Made from Protein and K-Carrageenan. *Journal of texture studies,* 28 (4), 405-419.

Jiang, N., Dev Kumar, G., Chen, J., Mishra, A., & Mis Solval, K. (2020). Comparison of concurrent and mixed-flow spray drying on viability, growth kinetics and biofilm formation of *Lactobacillus rhamnosus* GG microencapsulated with fish gelatin and maltodextrin. *LWT,* 124, 109200. doi: https://doi.org/10.1016/j.lwt.2020.109200

Kamel, B. S., & Deman, J. (1977). SOME FACTORS AFFECTING GELATIN GEL TEXTURE EVALUATION BY PENETRATION TESTING 1. *Journal of texture studies,* 8 (3), 327-337.

Karim, A. A., & Bhat, R. (2009). Fish gelatin: properties, challenges, and prospects as an alternative to mammalian gelatins. *Food Hydrocolloids,* 23 (3), 563-576. doi: https://doi.org/10.1016/j.foodhyd.2008.07.002

Kempka, A., Souza, S., Ulson de Souza, A., Prestes, R., & Ogliari, D. (2014). Influence of bloom number and plastifiers on gelatin matrices produced for enzyme immobilization. *Brazilian Journal of Chemical Engineering,* 31(1), 95-108.

Khong, N. M., Yusoff, F. M., Jamilah, B., Basri, M., Maznah, I., Chan, K. W., . . . . Nishikawa, J. (2018). Improved collagen extraction from jellyfish (*Acromitus hardenbergi*) with increased physical-induced solubilization processes. *Food Chemistry,* 251, 41-50.

Khong, N. M. H., Yusoff, F. M., Jamilah, B., Basri, M., Maznah, I., Chan, K. W., & Nishikawa, J. (2016). Nutritional composition and total collagen content of three commercially important edible jellyfish. *Food Chemistry,* 196, 953-960. doi: https://doi.org/10.1016/j.foodchem.2015.09.094

Kohandel, M., Sivaloganathan, S., & Tenti, G. (2008). Estimation of the quasi-linear viscoelastic parameters using a genetic algorithm. *Mathematical and Computer Modelling,* 47 (3), 266-270. doi: https://doi.org/10.1016/j.mcm.2007.04.006

Leone, A., Lecci, R. M., Durante, M., Meli, F., & Piraino, S. (2015). The bright side of gelatinous blooms: Nutraceutical value and antioxidant properties of three Mediterranean jellyfish (Scyphozoa). *Marine drugs,* 13 (8), 4654-4681.

Li, J., Li, Y., Li, Y., Yang, Z., & Jin, H. (2020). Physicochemical Properties of Collagen from *Acaudina molpadioides* and Its Protective Effects against H2O2-Induced Injury in RAW264. 7 Cells. *Marine drugs,* 18(7), 370.

Li, X. Y., Chen, X. G., Cha, D. S., Park, H. J., & Liu, C. S. (2009). Microencapsulation of a probiotic bacteria with alginate-gelatin and its properties. *Journal of microencapsulation,* 26 (4), 315-324.

Lueyot, A., Rungsardthong, V., Vatanyoopaisarn, S., Hutangura, P., Wongsa-Ngasri, P., Roytrakul, S., & Thumthanaruk, B. (2020). Improved physicochemical properties of type A gelatin from by-products salted jellyfish (*Lobonema smithii*) by optimized pretreatment and extraction conditions.

Marshall, M. R. (2010). Ash analysis. In *Food analysis* (pp. 109): Springer.

Nurul, A. G., & Sarbon, N. (2015). Effects of pH on functional, rheological and structural properties of eel (*Monopterus* sp.) skin gelatin compared to bovine gelatin. *International Food Research Journal,* 22, 572-583.

Osorio, F. A., Bilbao, E., Bustos, R., & Alvarez, F. (2007). Effects of concentration, bloom degree, and pH on gelatin melting and gelling temperatures using small amplitude oscillatory rheology. *International journal of food properties,* 10 (4), 841-851.

Papadopoulou, A., Rizos, E., & Aggeli, A. (2016). Rheological and Morphological Investigation of Renaturated Collagen Nanogels in Physiological-like Solution Conditions1. *Materials Today: Proceedings,* 3 (3), 875-888. doi: https://doi.org/10.1016/j.matpr.2016.02.021.

Phillips, A. T., & Signs, M. W. (2004). Desalting, concentration, and buffer exchange by dialysis and ultrafiltration. *Current protocols in protein science,* 38 (1), 4.4. 1-4.4. 15.

Rodsuwan, U., Thumthanaruk, B., Kerdchoechuen, O., & Laohakunjit, N. (2016). Functional properties of type A gelatin from jellyfish (*Lobonema smithii*). *International Food Research Journal,* 23 (2), 507.

Schacht, E., Nobels, M., Vansteenkiste, S., Demeester, J., Franssen, J., & Lemahieu, A. (1993). Some aspects of the crosslinking of gelatin by dextran dialdehydes. *Polymer gels and networks,* 1 (4), 213-224.

Siimon, K., Moisavald, K., Siimon, H., & Järvekülg, M. (2015). Increasing mechanical strength of electrospun gelatin nanofibers by the addition of aluminum potassium sulfate. *Journal of Applied Polymer Science,* 132 (35).

Solval, K. M., Sundararajan, S., Alfaro, L., & Sathivel, S. (2012). Development of cantaloupe (*Cucumis melo*) juice powders using spray drying technology. *LWT-Food Science and Technology,* 46 (1), 287-293.

Soria, A. C., Brokl, M., Sanz, M. L., & Martínez-Castro, I. (2012). Sample preparation for the determination of carbohydrates in food and beverages.

Tan, Z.-j., Li, F.-f., Xu, X.-I., & Xing, J.-m. (2012). Simultaneous extraction and purification of aloe polysaccharides and proteins using ionic liquid based aqueous two-phase system coupled with dialysis membrane. *Desalination,* 286, 389-393. doi: https://doi.org/10.1016/j.desal.2011.11.053

USDA. (2021). Soil Bulk Density/Mositure/Aeration Retrieved from https://www.nrcs.usda.gov/Internet/FSE_DOCUMENTS/nrcs142p2_053260.pdf Van der Meeren, P., Dewettinck, K., & Saveyn, H. (2004). Particle size analysis. *FOOD SCIENCE AND TECHNOLOGY-NEW YORK-MARCEL DEKKER-*, 138 (3), 1805.

Wang, W., Shen, M., Liu, S., Jiang, L., Song, Q., & Xie, J. (2018). Gel properties and interactions of Mesona blumes polysaccharide-soy protein isolates mixed gel: The effect of salt addition. *Carbohydrate Polymers,* 192, 193-201. doi: https://doi.org/10.1016/j.carbpol.2018.03.064

Wang, Y., Zhang, M., & Mujumdar, A. S. (2013). Effect of cassava starch gel, fish gel and mixed gels and thermal treatment on structure development and various quality parameters in microwave vacuum-dried gel slices. *Food Hydrocolloids,* 33 (1), 26-37. doi: https://doi.org/10.1016/j.foodhyd.2013.02.005

Wardhani, D. H., Rahmawati, E., Arifin, G. T., & Cahyono, H. (2017). Characteristics of Demineralized Gelatin From Lizardfish (*Saurida* Spp.) Scales Using Naoh-nacl Solution. *Jurnal Bahan Alam Terbarukan,* 6 (2), 132-142.

Yihong, Q., Yisheng, C., Geoff, G. Z. Z., Lirong, L., & William, P. (2009). *Developing Solid Oral Dosage Forms: Pharmaceutical Theory and Practice* (Vol. 1st ed). Amsterdam: Academic Press.

Zhang, F., Xu, S., & Wang, Z. (2011). Pre-treatment optimization and properties of gelatin from freshwater fish scales. *Food and Bioproducts Processing,* 89 (3), 185-193.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A method for producing marine-derived gelatin powders having a low Bloom strength of about 20 g to 75 g, consisting essentially of:

soaking solids from a dried, salted marine-derived collagen source in citric acid for 10 min to 4.5 hours to open intact collagen molecules;

draining excess liquid;

homogenizing the marine-derived collagen source;

hydrolyzing the entire marine-derived collagen source in a water bath to produce a liquid product comprising partially hydrolyzed collagen molecules; and dialyzing the liquid product with deionized water to at least partially demineralize the marine-derived collagen source to produce a dialyzed marine-derived collagen product with a reduced mineral content, where the liquid product is dialyzed against room temperature deionized water under agitation in a sealed dialysis membrane having a molecular weight cutoff of 6-8 kD, where the deionized water is replaced at intervals during dialysis.

2. The method of claim 1, further comprising lyophilizing the dialyzed marine-derived collagen product.

3. The method of claim 2, further comprising pulverizing the dialyzed and lyophilized marine-derived collagen product to obtain a dialyzed gelatin powder having gelling properties.

4. The method of claim 1, wherein the marine-derived collagen source is an edible jellyfish species.

5. The method of claim 1, wherein the marine-derived collagen source is dried, salted *Stomolophus meleagris.*

6. The method of claim 1, wherein the dialyzing removes about 75% or more total mineral content from the marine-derived collagen source, wherein the mineral content comprises calcium, potassium, magnesium, phosphorus, sulfur, aluminum, boron, cadmium, chromium, copper, iron, manganese, molybdenum, sodium, nickel, lead, and zinc.

7. The method of claim 1, wherein the dialyzing removes about 90% or more of Na from the marine-derived collagen source.

8. The method of claim 1, wherein the solids are soaked in the citric acid solution for ten minutes and wherein the solution has a concentration of about 1.5% w/v.

* * * * *